US012767790B2

(12) United States Patent
Pfaendner et al.

(10) Patent No.: US 12,767,790 B2

(45) Date of Patent: Oct. 20, 2026

(54) METHOD OF STABILIZING HALOGEN-FREE THERMOPLASTIC RECYCLATES, PLASTICS COMPOSITION, STABILIZER COMPOSITION AND USE OF THE STABILIZER COMPOSITION

(71) Applicant: FRAUNHOFER-GESELLSCHAFT ZUR FÖRDERUNG DER ANGEWANDTEN FORSCHUNG E. V., Munich (DE)

(72) Inventors: Rudolf Pfaendner, Rimbach (DE); Elke Metzsch-Zillingen, Steffeln (DE)

(73) Assignee: Fraunhofer-Gesellschaft zur förderung der angewandten Forschung e.V., Munich (DE)

(*) Notice: Subject to any disclaimer, the term of this patent is extended or adjusted under 35 U.S.C. 154(b) by 0 days.

(21) Appl. No.: 17/425,267

(22) PCT Filed: Jan. 24, 2020

(86) PCT No.: PCT/EP2020/051777

§ 371 (c)(1),
(2) Date: Jul. 22, 2021

(87) PCT Pub. No.: WO2020/152337

PCT Pub. Date: Jul. 30, 2020

(65) Prior Publication Data

US 2022/0119624 A1 Apr. 21, 2022

(30) Foreign Application Priority Data

Jan. 24, 2019 (DE) ..................... 10 2019 200 905.0

(51) Int. Cl.

| | |
|---|---|
| ***C08L 23/00*** | (2006.01) |
| ***C08F 10/06*** | (2006.01) |
| ***C08K 5/05*** | (2006.01) |
| ***C08K 5/10*** | (2006.01) |
| ***C08K 5/134*** | (2006.01) |
| ***C08K 5/353*** | (2006.01) |
| ***C08K 5/37*** | (2006.01) |
| ***C08K 5/405*** | (2006.01) |
| ***C08K 5/52*** | (2006.01) |
| ***C08L 23/10*** | (2006.01) |
| ***C08L 25/08*** | (2006.01) |
| ***C08L 25/10*** | (2006.01) |

(52) U.S. Cl.

CPC .............. *C08K 5/405* (2013.01); *C08F 10/06* (2013.01); *C08K 5/1345* (2013.01); *C08K 5/353* (2013.01); *C08K 5/37* (2013.01); *C08K 5/52* (2013.01); *C08L 23/10* (2013.01); *C08K 2201/019* (2013.01); *C08L 2201/08* (2013.01); *C08L 2207/20* (2013.01)

(58) Field of Classification Search

CPC ...... C08L 2207/20; C08L 23/06; C08L 23/10; C08L 23/12; C08L 101/00; C08L 2201/08; C08J 11/04; Y02W 30/62; Y02P 20/143; C08K 2201/019

See application file for complete search history.

(56) References Cited

U.S. PATENT DOCUMENTS

| | | | | |
|---|---|---|---|---|
| 5,298,540 | A | 3/1994 | Pauquet et al. | |
| 5,789,470 | A | 8/1998 | Herbst et al. | |
| 6,077,891 | A | 6/2000 | Herbst et al. | |
| 6,251,972 | B1 | 6/2001 | Hoffmann et al. | |
| 6,376,584 | B1 * | 4/2002 | Galbo ................. | C07D 211/94 546/244 |
| 6,525,158 | B1 | 2/2003 | Hoffmann et al. | |
| 6,723,836 | B1 * | 4/2004 | Araki ................ | C08G 18/2865 536/120 |
| 10,138,354 | B2 | 11/2018 | Groos et al. | |
| 10,214,631 | B2 | 2/2019 | Pfaendner et al. | |
| 10,323,136 | B2 | 6/2019 | Pfaendner et al. | |
| 10,364,340 | B2 | 7/2019 | Pfaendner et al. | |
| 10,370,537 | B2 | 8/2019 | Pfaendner et al. | |
| 10,450,442 | B2 | 10/2019 | Pfaendner et al. | |
| 10,544,284 | B2 | 1/2020 | Pfaendner et al. | |
| 10,781,296 | B2 | 9/2020 | Groos et al. | |
| 10,913,743 | B2 | 2/2021 | Pfaendner et al. | |
| 11,292,859 | B2 | 4/2022 | Klein et al. | |
| 11,407,720 | B2 | 8/2022 | Fischer et al. | |
| 2005/0250889 | A1 | 11/2005 | Malik et al. | |
| 2008/0241450 | A1 * | 10/2008 | Zeng ...................... | C08L 67/02 524/502 |

(Continued)

FOREIGN PATENT DOCUMENTS

| | | |
|---|---|---|
| CN | 1098115 A | 2/1995 |
| CN | 1444624 A | 9/2003 |

(Continued)

OTHER PUBLICATIONS

A xopy of the machine translation into Englsih of JP 2005-139422 A; Akagawa (Year: 2005).*

(Continued)

*Primary Examiner* — Karuna P Reddy

(74) *Attorney, Agent, or Firm* — Leydig, Voit & Mayer, Ltd.

(57) ABSTRACT

The invention relates to a method of stabilizing halogen-free thermoplastic recyclates against oxidative, thermal and/or actinic degradation. The invention also relates to a correspondingly stabilized plastics composition, a stabilizer composition for stabilizing halogen-free thermoplastic recyclates and uses thereof.

12 Claims, No Drawings

(56) References Cited

U.S. PATENT DOCUMENTS

| | | | |
|---|---|---|---|
| 2016/0052927 | A1 | 2/2016 | Pfaendner et al. |
| 2016/0222202 | A1 | 8/2016 | Kato |
| 2016/0272789 | A1 | 9/2016 | Pfaendner et al. |
| 2017/0107375 | A1 | 4/2017 | Pfaendner et al. |
| 2017/0121499 | A1 | 5/2017 | Pfaendner et al. |
| 2017/0260362 | A1 | 9/2017 | Pfaendner et al. |
| 2017/0260363 | A1 | 9/2017 | Pfaendner et al. |
| 2017/0260366 | A1 | 9/2017 | Pfaendner et al. |
| 2017/0267835 | A1 | 9/2017 | Groos et al. |
| 2018/0186970 | A1 | 7/2018 | Groos et al. |
| 2019/0248927 | A1 | 8/2019 | Klein et al. |
| 2020/0231783 | A1 | 7/2020 | Pfaendner et al. |
| 2020/0317886 | A1 | 10/2020 | Pfaendner et al. |
| 2020/0361879 | A1 | 11/2020 | Fischer et al. |
| 2021/0130582 | A1 | 5/2021 | Ciesielski et al. |
| 2021/0388176 | A1 | 12/2021 | Metzsch-Zilligen et al. |
| 2022/0073734 | A1 | 3/2022 | Polidar et al. |
| 2022/0119624 | A1 | 4/2022 | Pfaendner et al. |
| 2022/0162422 | A1 | 5/2022 | Pfaendner |
| 2022/0267568 | A1 | 8/2022 | Pfaendner |
| 2022/0340717 | A1 | 10/2022 | Olschewski et al. |

FOREIGN PATENT DOCUMENTS

| | | | | |
|---|---|---|---|---|
| CN | 102112549 | A | | 6/2011 |
| DE | 288161 | A5 | | 3/1991 |
| DE | 102005008598 | A1 | | 8/2006 |
| EP | 0470048 | A2 | * | 2/1992 |
| EP | 0 506 614 | A2 | | 9/1992 |
| EP | 0 702 704 | A1 | | 3/1996 |
| EP | 0 662 101 | B1 | | 5/2009 |
| EP | 2 960 272 | A1 | | 12/2015 |
| JP | H08-511045 | A | | 11/1996 |
| JP | H1062912 | A | * | 3/1998 |
| JP | H10-503790 | A | | 4/1998 |
| JP | H10-503791 | A | | 4/1998 |
| JP | 2000-506185 | A | | 5/2000 |
| JP | 2005139422 | A | * | 6/2005 |
| JP | 2012-118325 | A | | 6/2012 |
| KR | 10-0289104 | B1 | | 5/2001 |
| KR | 10-2002-0075922 | A | | 10/2002 |
| WO | WO 94/29377 | A1 | | 12/1994 |
| WO | WO 97/30112 | A2 | | 8/1997 |
| WO | WO 01/62836 | A1 | | 8/2001 |
| WO | WO 2010/014791 | A1 | | 2/2010 |

OTHER PUBLICATIONS

A xopy of the machine translation into Englsih of JP H1062912 AA; Akao (Year: 1998).*
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/287,079, filed Apr. 20, 2021.
U.S. Appl. No. 17/423,800, filed Jul. 16, 2021.
U.S. Appl. No. 17/441,626, filed Sep. 21, 2021.
U.S. Appl. No. 17/625,387, filed Jan. 7, 2022.
U.S. Appl. No. 17/640,174, filed Mar. 3, 2022.
U.S. Appl. No. 17/906,080, filed Sep. 12, 2022.
U.S. Appl. No. 17/907,038, filed Sep. 22, 2022.
U.S. Appl. No. 17/995,978, filed Oct. 11, 2022.
U.S. Appl. No. 17/996,747, filed Oct. 20, 2022.
Craig et al., "Mechanical properties of photo-degraded recycled photo-degraded polyolefins," *J. Mater. Sci.* 41(3): 993-1006 (2006).
Maxwell, "Weathering of recycled photo-degraded polyethylene," *Polym. Eng. Sci.* 48(2): 381-385 (2008).
Pfaendner et al., "Recycling and restabilization of polymers for high quality applications. An Overview," *Die Angew. Macromol. Chemie* 232(1): 193-227 (1995).
Pfaendner, "Improving the Quality of Recycled Materials," *Kunststoffe International* Dec. 2015: 41-44 (2015).
Pospisil et al., "Chain-breaking stabilizers in polymers: the current status," *Polymer Degradation and Stability* 49(1): 99-110 (1995).
Richaud et al., "Polyethylene stabilization against thermal oxidation by a trimethylquinoleine oligomer," *Polymer Degradation and Stability* 94(3): 410-420 (2009).
German Patent Office, Examination Report in German Patent Application No. 10 2019 200 905.0 (Mar. 24, 2021).
European Patent Office, International Search Report in International Application No. PCT/EP2020/051777 (Apr. 29, 2020).
European Patent Office, Written Opinion in International Application No. PCT/EP2020/051777 (Apr. 29, 2020).
International Bureau of WIPO, International Preliminary Report on Patentability in International Application No. PCT/EP2020/051777 (Jul. 27, 2021).
China National Intellectual Property Administration, First Office Action in Chinese Patent Application No. 2020800109328 (Jan. 11, 2023).
Japan Patent Office, Notification of Reasons for Refusal in Japanese Patent Application No. 2021-542450 (Aug. 15, 2023).
Brazilian Institute of Industrial Property, Technical Examination Report and Opinion in Brazilian Patent Application No. BR112021013753-0 (May 14, 2024).
Korean Intellectual Property Organization, Request for Submission of an Opinion in Korean Patent Application No. 10-2021-7027001 (Apr. 29, 2024).
Brazilian Institute of Industrial Property, Technical Examination Report and Opinion in Brazilian Patent Application No. BR112021013753-0 (Sep. 20, 2024).
Mexican Institute of Industrial Property, Substantive Requirement in Mexican Patent Application No. MX/a/2021/008425 (Aug. 4, 2025).

* cited by examiner

METHOD OF STABILIZING HALOGEN-FREE THERMOPLASTIC RECYCLATES, PLASTICS COMPOSITION, STABILIZER COMPOSITION AND USE OF THE STABILIZER COMPOSITION

CROSS-REFERENCE TO RELATED APPLICATIONS

This patent application is the U.S. national phase of International Application No. PCT/EP2020/051777, filed on Jan. 24, 2020, which claims the benefit of German Patent Application No. 10 2019 200 905.0, filed Jan. 24, 2019, the disclosures of which are incorporated herein by reference in their entireties for all purposes.

The present invention relates to a method for stabilizing halogen-free thermoplastic recyclates against oxidative, thermal, and/or actinic degradation. The subject matter of the present invention is equally a correspondingly stabilized plastic composition, a stabilizer composition for stabilizing halogen-free thermoplastic recyclates and uses thereof.

Plastic recyclates are a growing market and an important element in recycling management of natural resources, with recyclates ideally being intended to replace new plastics having an identical or at least comparable property profile. However, with recyclates from the production of plastic parts (so-called “post industrial” recyclates) and above all with waste plastics (so-called “post consumer” recyclates), there are often changes in the polymer chain due to mechanochemical, chemical, or light induced processes that are irreversible over a large number of years during the first processing steps (e.g. compounding, injection molding) and the use (see e.g. R. Pfaendner et al., Angew. Makromol. Chemie 1995, 232, 193-227, J. Pospisil et al., Pol. Degr. Stab. 1995, 48, 351-358). New chemical groups are produced in the polymer chain and/or the composition of the polymer is changed on the molecular level by radical reactions in the presence of oxygen, generally called autooxidation. The groups produced in the aging process are here frequently carbonyl groups, aldehyde groups, or acid groups, in particular with polyolefins such as polyethylene or polypropylene. The concentration of these newly formed groups increases with the length of use and the area of use (UV light, high temperatures, contact media). The structural inhomogeneities of a recyclate influence the plastic properties such as the mechanical properties. It furthermore applies that recyclates or pre-damaged plastics are more sensitive to oxidation than as new material since degradation products act as initiator sites for a further oxidation or as prodegrants (A. S. Maxwell, Pol. Eng. Sci. 2008, 381-385, I. H. Craig, J. R. White, J. Mater. Sci. 2006, 41, 993-1006). Post-stabilization with selected stabilizers such as antioxidants is an important method to achieve a quality improvement of plastic recyclates. The stabilizers used protect the recyclate from further oxidative (or photo-oxidative) damage or at least delay it. Due to the described structural differences of the recyclate and the new product, the optimized stabilizer composition for a recyclate also differs from the stabilization composition of the new product (see e.g. R. Pfaendner, Kunststoffe International 12/2015, 41-44).

Due to the differences now recognized between new plastic products and plastic recyclates, special recyclate stabilizer compositions have become known and are also available as commercial products (e.g., Recyclostab products of BYK-Chemie GmbH, Bensheim). Known technical stabilization solutions that take account of the demands of recyclates are, for example: described in the following patents/patent applications:

Stabilization composition consisting of a phenolic antioxidant, a phosphite, and a fatty acid salt (EP 0662101).

Stabilization composition consisting of a phenolic antioxidant, a phosphite, and a metal oxide such as calcium oxide (U.S. Pat. Nos. 6,525,158, 6,251,972).

Stabilization composition consisting of a phenolic antioxidant and a polyfunctional epoxide (EP 0702704).

Stabilization by a macrocyclic piperidine (U.S. Pat. No. 5,789,470).

Stabilization composition consisting of a secondary aromatic amine and a polyfunctional epoxide (WO 97/30112).

Discoloration of damaged polyolefins by a hydroxylamine (EP 0470048).

Mixture of antioxidants, lubricants, anti-blocking agents, UV stabilizers, and antistatic agents for recyclate films (DD 288161)

Stabilization composition for mixed plastics consisting of a phenolic antioxidant and a phosphite/phosphonite (EP 0506614)

Despite the known solutions for the post-stabilization of recyclates, there is still a demand for particularly high performance, environmentally friendly, and inexpensive stabilizer compositions for recyclates that are obtained with the compositions in accordance with the invention.

Previous recyclate stabilizers (see above) are modifications of stabilizers for new plastics; none of the combinations, mentioned enable an interaction or reaction with the carbonyl groups frequently produced on aging/oxidation. The present invention thus represents a new approach in the stabilization of plastic recyclates.

WO 97/30112 describes stabilization compositions consisting of a secondary aromatic amine and a polyfunctional epoxide. They are, however, (semi)aromatic amines and not aliphatic amines. There is furthermore EP 0470048 (see appendix, discoloring of damaged polyolefins by a hydroxylamine). The hydroxylamines mentioned there have a free OH group and thus differ structurally from the mentioned hydroxylamine ethers or hydroxylamine esters that include a free amino group.

It is therefore the object of the present invention to provide means and ways to stabilize halogen-free thermoplastic recyclates.

This object is achieved by the features of the stabilization method, the stabilized plastic recyclate composition, the stabilizer composition, and usage of the stabilizer composition described herein, as well as the advantageous developments thereof.

The subject matter of the present invention thus flows into a first aspect: A method for stabilizing halogen-free thermoplastic recyclates against oxidative, thermal, and/or actinic degradation, in which (A) at least one compound enabled to react with carbonyl groups, in combination with (B) at least one primary antioxidant and/or (C) at least one secondary antioxidant, are introduced into a halogen-free thermoplastic recyclate, with no alditols or cyclitols being used.

Surprisingly it could be found that compounds capable of reacting with carbonyl groups present in plastic recyclates have a high potential to effectively protect the corresponding plastic recyclates against oxidative, thermal, and/or actinic degradation.

In accordance with a preferred embodiment, the at least one compound enabled to react with carbonyl groups is selected from the group comprising primary aliphatic amines, secondary aliphatic amines, thiols, hydroxylamine ethers, hydroxylamine esters, hydrazines, oligomers, or polymers having alcohol groups bound to aliphatic carbons such as polyvinyl alcohols and their copolymers with vinyl acetate, or polyhydroxy(meth)acrylates, and hydantoins or thiohydantoins.

Exemplary oligomers/polymers having alcohol groups bound to aliphatic carbons are, for example, the compounds having the structures shown below:

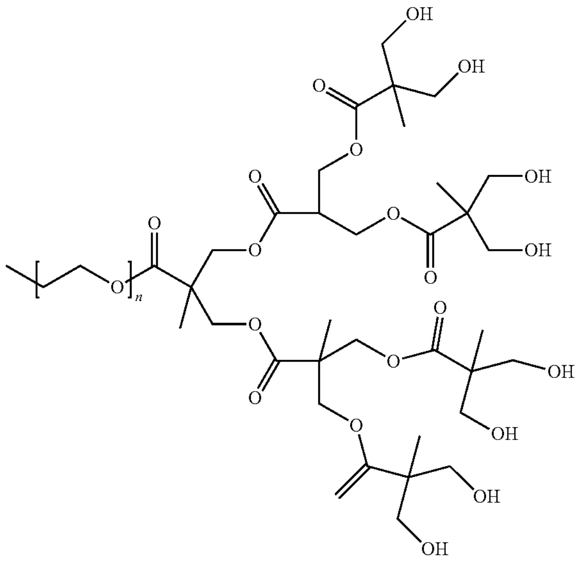

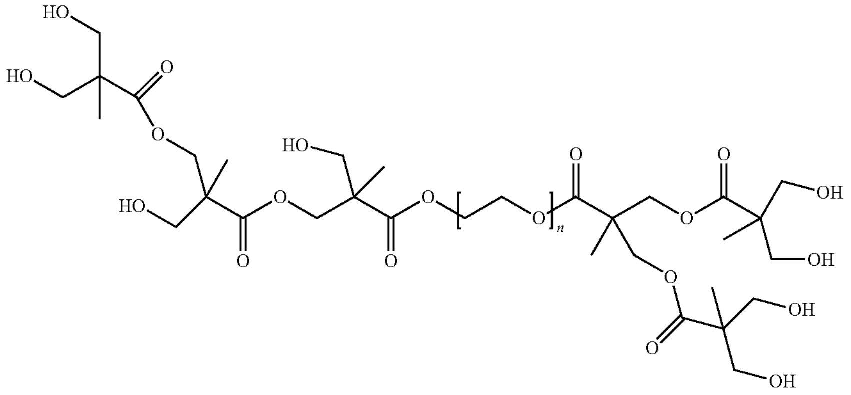

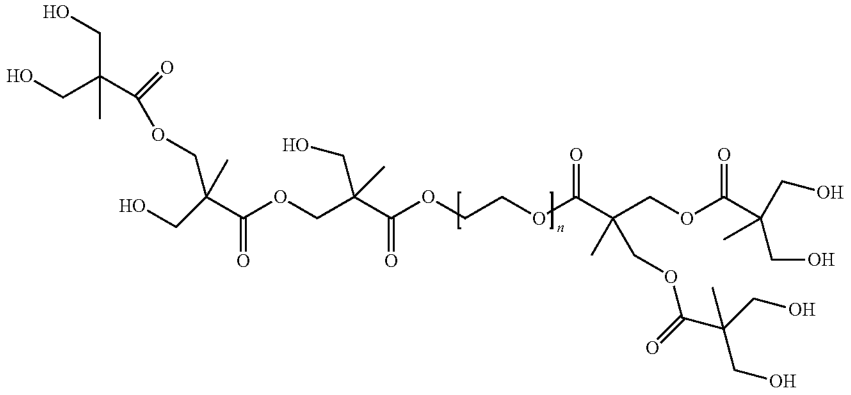

-continued

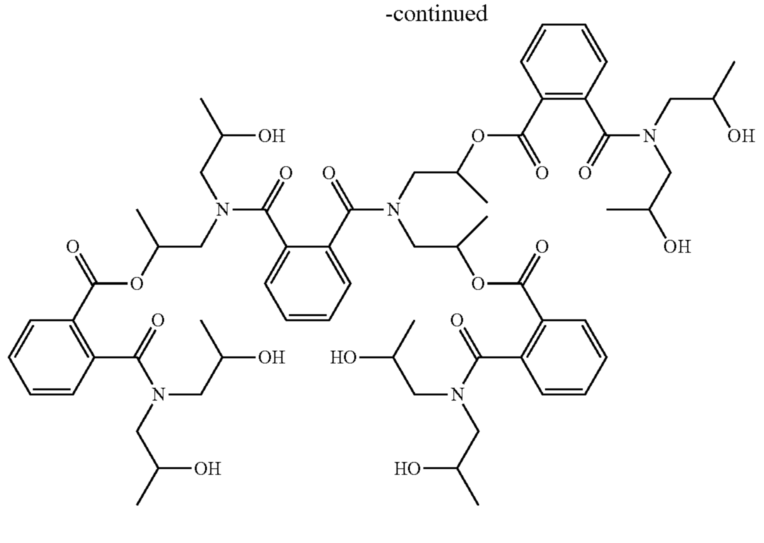

The index n in connection with the aforesaid compounds preferably signifies 1 to 10.

The at least one compound enabled to react with carbonyl groups is introduced is in particular advantageously selected from the group comprising laurylamine, stearylamine, hexamethylenediamine, decanediamine, dodecanediamine, dilaurylamine, distearylamine, 1-dodecanethiol, 1-hexadecanethiol, polycaprolactone-tetra-3-mercaptopropionate, polyvinyl alcohol having a weight-averaged molecular weight of 1,000 to 50,000 g/mol, polyhydroxyl(meth)acrylate having a weight-averaged molecular weight of 1,000 to 50,000 g/mol, imidazolidine-2-4-dione, and compounds having the following structures:

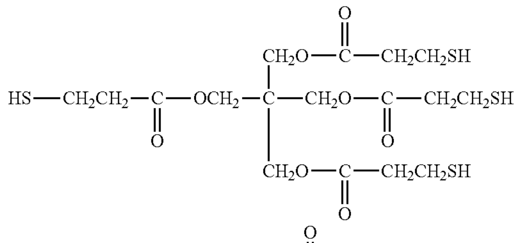

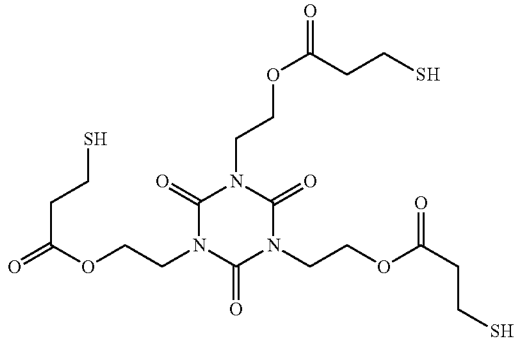

In accordance with the present invention, a plastic recyclate is understood as a recyclate in accordance with the definition of the term as per the standard DIN EN 15347:2007. Furthermore relevant international standards exist for many kinds of plastic recyclates. DIN EN 15353:2007 is, for example, relevant to PET plastic recyclates. PS recyclates are described in more detail in DIN EN 15342:2008. PE recyclates are treated in DIN EN 15344:2008. PP recyclates are characterized in DIN EN 15345:2008. For the purposes of the corresponding specific plastic-recyclates, the present invention incorporates the definitions of these international standards.

Unlike new plastics, plastic recyclates usually have pre-damage, i.e. new chemical groups are produced on the polymer chain by oxidative or (photo)oxidative processes. With polyolefins, these are e.g. carbonyl groups that are not present or are only present to a highly subordinate degree with new products. The concentration of the carbonyl groups is therefore simultaneously a measure for the pre-damage of the polymer. The concentration of carbonyl groups can be determined in accordance with known analytical methods such as infrared spectroscopy, such as is described in E. Richaud et al. Pol. Degr. Stab. 2009, 94, 410-420. In this case, the absorption of the carbonyl vibration in the region of 1720 $cm^{-1}$ is measured.

“Halogen-free” is to be understood in accordance with the invention such that the thermoplastic contains less than 1% of halogenated polymers such as PVC or PVDC. The halogen-free thermoplastic preferably contains less than 0.5%, particularly preferably less than 0.1%, halogenated polymers. The halogen-free thermoplastic very particularly preferably does not contain any halogenated polymers at all.

In the method in accordance with the invention, at least one compound (component (A)) enabled to react with carbonyl groups is introduced in combination with at least one primary antioxidant (component (B)) and/or at least one secondary antioxidant (component (C)) into a halogen-free thermoplastic recyclate. Components (A) to (C) can here be introduced into the plastic recyclates individually or separately from one another. It is alternatively possible that components (A) to (C) are introduced into the plastic recyclate together in the form of a composition comprising the components (A) to (C) or in the form of a composition consisting of the components (A) to (C).

In the event that at least one primary antioxidant and at least one secondary antioxidant are used, they can also be introduced into the plastic recyclate individually or separately from one another or together in the form of a mixture.

Component (A) used in accordance with the invention in combination with component (B) and/or compound (C) used in addition to component (A) act together as a stabilizer for the halogen-free thermoplastic recyclate, with the oxidative, thermal, and/or actinic degradation of the halogen-free thermoplastic recyclate being inhibited or prevented. In other words, the plastic is stabilized against oxidative, thermal, and/or actinic degradation by the introduction of component (A) and optionally additionally of component (B) into the halogen-free thermoplastic recyclate.

The halogen-free thermoplastic recyclate used in the method in accordance with the invention is preferably a polyolefin recyclate, e.g. a polypropylene recyclate or a polyethylene recyclate.

The composition in accordance with the invention is furthermore particularly suitable for stabilizing pre-damaged recyclates, in particular polyolefin recyclates whose carbonyl group content, determined by absorption in the infrared spectrum, amounts to at least 0.01 mol/kg, is preferably greater than 0.02 mol/kg, and is particularly preferably greater than 0.05 mol/kg.

In a preferred embodiment, the at least one primary antioxidant (B) is selected from the group comprising phenolic antioxidants, amines, lactones, and mixtures thereof.

There can, for example, be used as phenolic antioxidants:

Alkylated monophenols, such as 2,6-Di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof;

alkylthiomethyl phenols, such as 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol;

hydroquinones and alkylated hydroquinones, such as 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxylphenyl)adipate;

tocopherols, such as α-, β-, γ-, δ-tocopherol and mixtures hereof (vitamin E);

hydroxylated thiodiphenyl ethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;

alkylide bisphenols such as 2,2'methylenebis(6-tert-butyl-4-methylphenol), 2,2'-methylenebis(6-tert-butyl-4-ethylphenol), 2,2'-methylenebis[4-methyl-6-(α-methylcyclohexyl)phenol]; 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol, 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5=tert-butyl-4-hydroxy-2-methylphenyl)-3-n-dodecylmercaptobutane, ethyleneglycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl) butane, 2,2-bis(3,5-di-tert-butyl-4-hydroxyphenyl) propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds such as 3,5,3',5'-tetra-tert-butyl-4,4'-dihydroxydibenzylether, cctadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide, isooctyl-3,5-di-tert-butyl-4-hydroxybenzylmercaptoacetate;

hydroxybenzylated malonates such as dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;

aromatic hydroxybenzyl compounds, such as 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate;

benzyl phosphonates, such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;

acylaminophenols, such as 4=hydroxylauranilide, 4-hydroxystearanilide, octyl-N-(3,5-di-tert-butyl-4-hydroxyphenyl)carbamate;

esters of β-(3,5-di-tert-butyl-4-hydroxyphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethyleneglycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of β-(3,5-di-tert-butyl-4-hydroxyphenyl)propionic acid with mono- or polyhydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, thiaundecanol, 3-thiapentadecanol, trimethylhexanediol, trimethylolpropane, 4-hydroxymethyl-1-phospha-2,6,7-trioxabicyclo[2.2.2]octane;

esters of β-(3,5-di-tert-butyl-4-hydroxyphenyl)acetic acid with mono- or polyhydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; amides of β-(3,5-di-tert-butyl-4-hydroxyphenyl)propionic acid, such as N,N'-bis(3,5-di-tert-butyl-4-hydroxyphenylpropionyl) hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl] oxamide (Naugard®XL-1, marketed by Addivant);

ascorbic acid (vitamin C).

Particularly preferred phenolic antioxidants are the following structures:

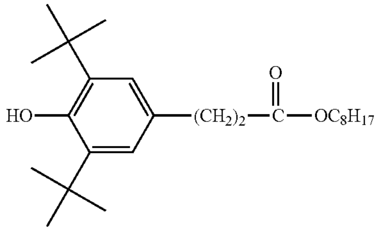

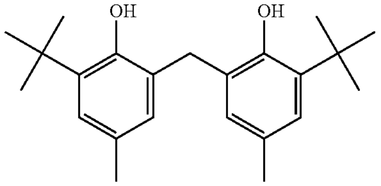

-continued

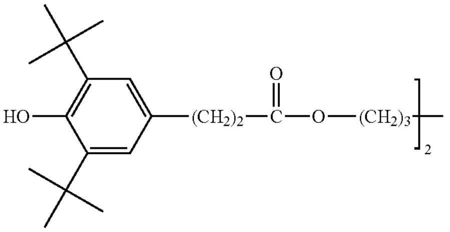

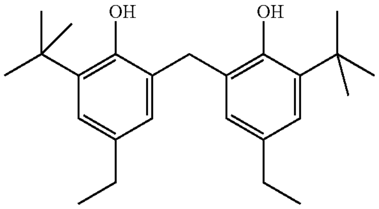

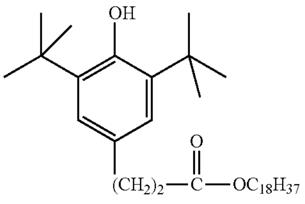

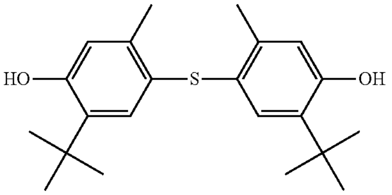

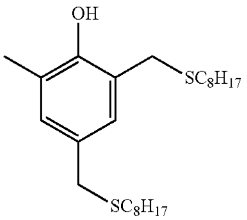

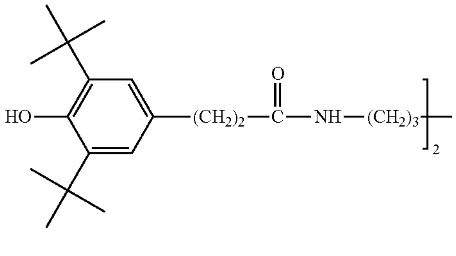

-continued
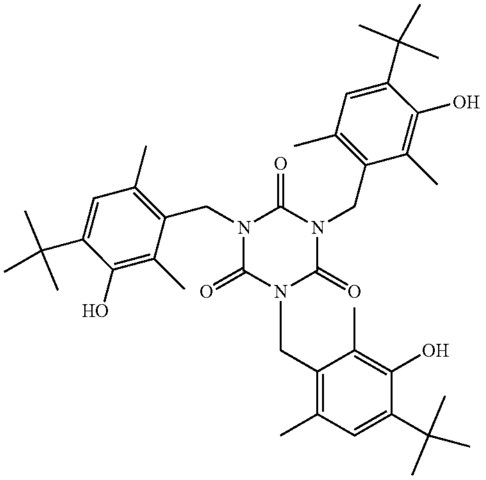
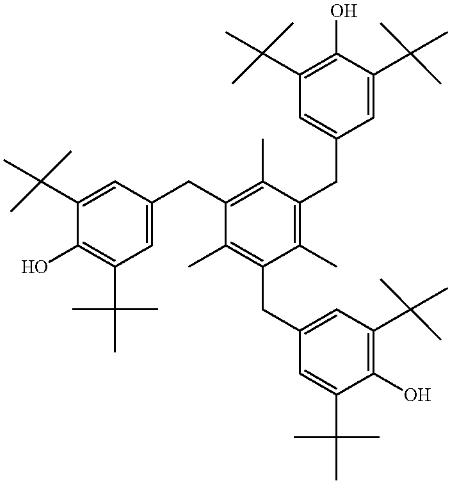
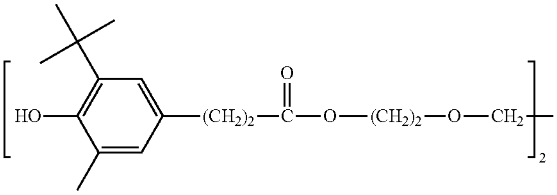
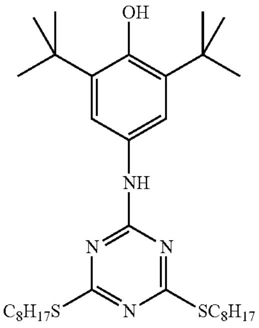
-continued
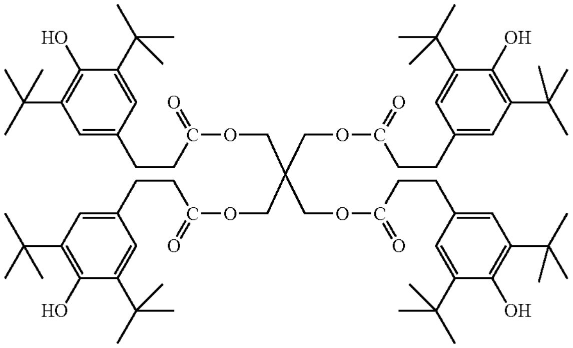
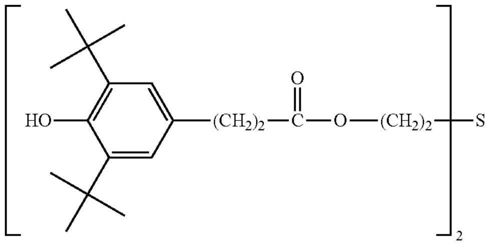
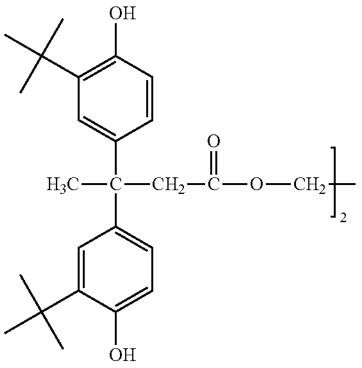
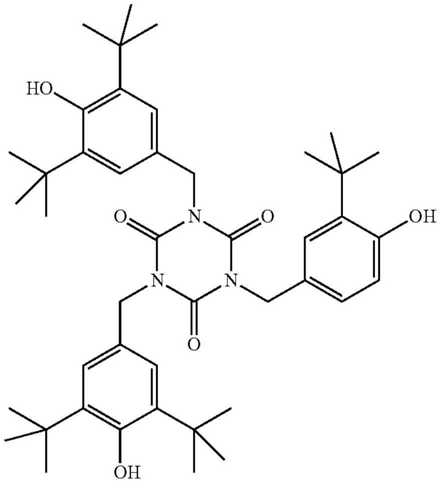
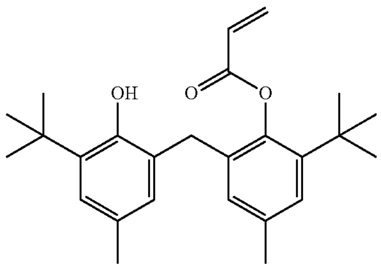

-continued

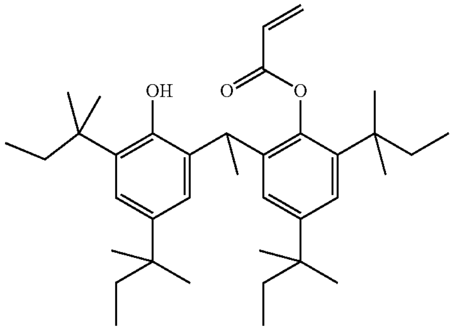

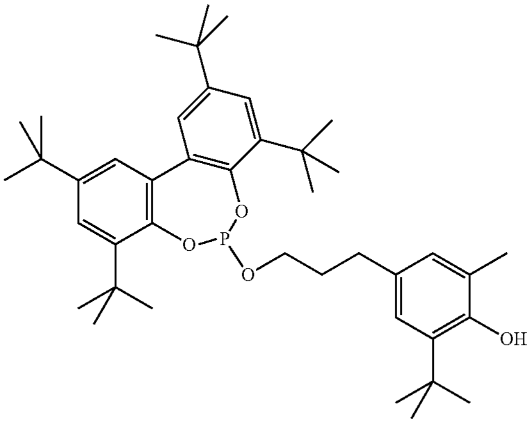

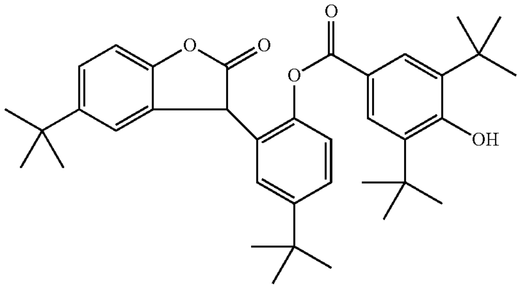

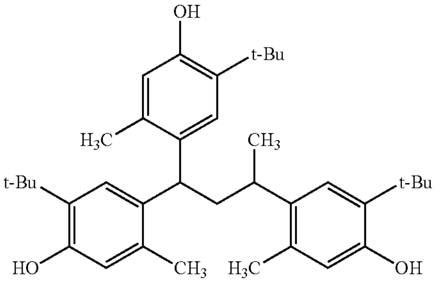

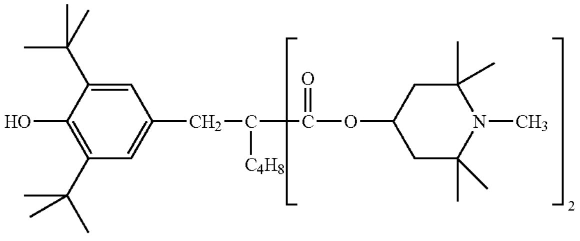

-continued

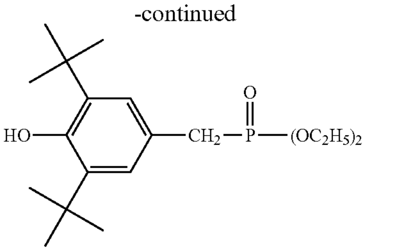

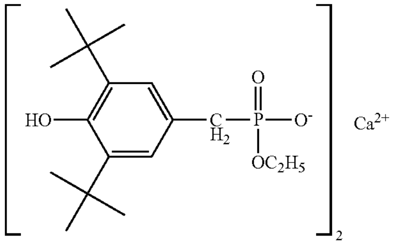

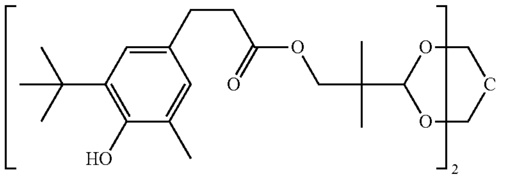

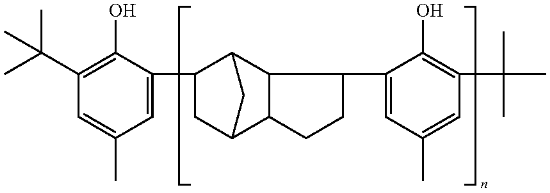

Very particularly preferred phenolic antioxidants are octadecyl-3-(3,5-di-tert-butyl-4-hydroxyphenyl)propionate and pentaerythritol tetrakis(3-(3,5-di-tert-butyl-4-hydroxyphenyl)propionate)

Further preferred phenolic antioxidants are phenolic antioxidants based on sustainable natural resources such as tocopherols (vitamin E), tocotrienols, tocomonoenols, carotenoids, hydroxytyrosol, flavonols such as chrysin, quercetin, hesperidin, nehesperidin, naringin, morin, camphor oil, fisetin, anthocyanins such as delphinidin and malvidin, curcumin, carnosic acid, carnosol, rosemarinic acid, tannin, and resveratrol.

The phenolic antioxidant pentaerythritol-tetrakis[3-(3,5-di-tert-butyl-4-hydroxyphenyl)propionate or octadecyl 3-(3,5-di-tert-butyl-4-hydroxyphenyl)propionate is very particularly preferably used as the primary antioxidant.

For example, the following may be used as amine antioxidants:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluene sulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-actadecanoylamino-phenol, bis(4-methpxyphenyl)amine, 2,6-di-tert-butyl-4-dimethylaminoethyl-phenol, 2,4'-diaminodiphenylmethane, 4,4'-diaminodiphenylmethane, N,N,N',N'-tetramethyl-4,4'-diaminodiphenylmethane, 1,2-bis[(2-methyl-phenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and diaikylated tert-octylphenothiazinene, N-allylphenothiazine, N,N,N',N'-tetraphenyl-1,4-diaminobut-2-ene and mixtures or combinations hereof.

Preferred amine antioxidants are:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine.

Further preferred aminic antioxidants are hydroxylamines or N-oxides (nitrones) such as N,N-dialkylhydroxylamines, N,N-dibenzylhydroxylamine, N,N-dilaurylhydroxylamine, N,N-distearylhydroxylamine, N-benzyl-α-phenylnitrone, N-octadecyl-α-hexadecylnitron, and Genox EP (marketed by Addivant) in accordance with the formula:

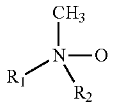

$R_1$, $R_2$ = $C_{14}$-$C_{24}$ alkyl

Preferred lactones are:

Benzofuranones and indolinones such as 3-(4-(2-acetoxy-ethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-(2-hydroxyethoxy]phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one as well as lactones that additionally contain a phosphite group such as

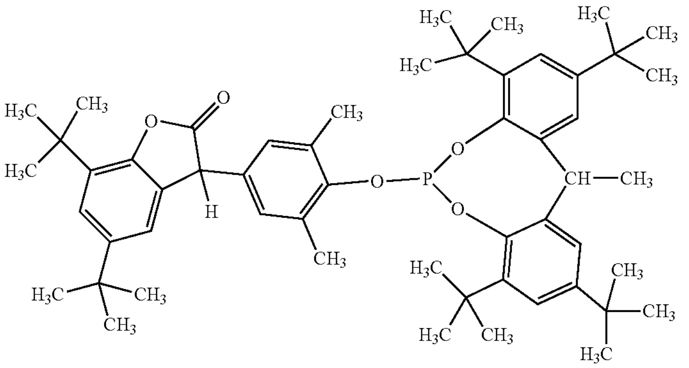

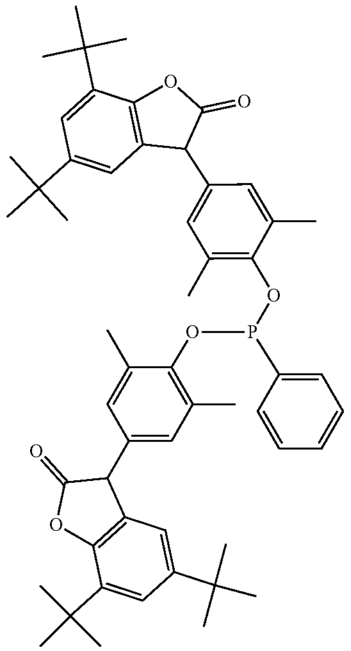

-continued

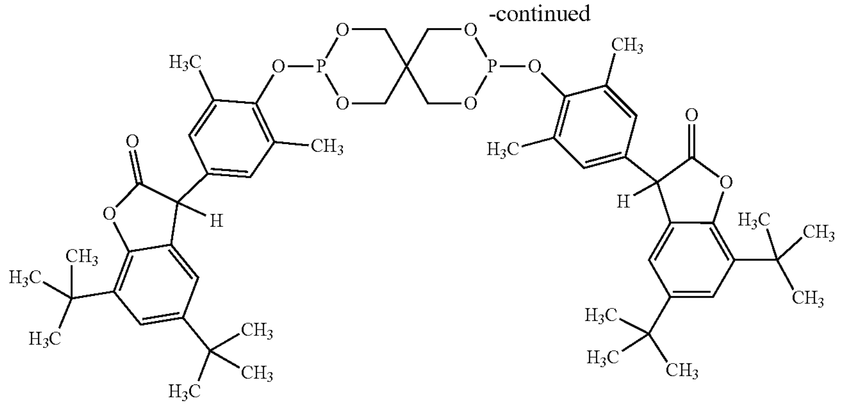

A further suitable group of antioxidants are isoindolol[2,1-A]chinazoniles such as

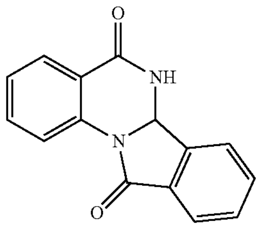

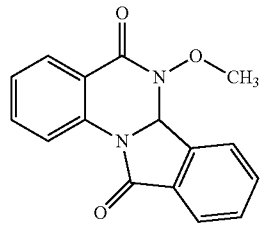

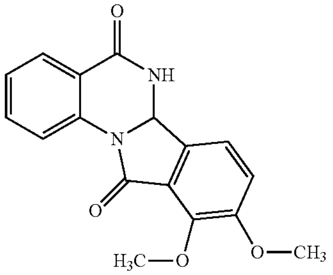

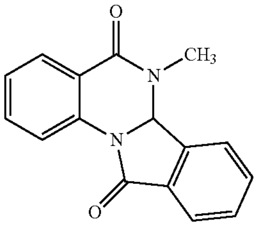

A further preferred variant of the method in accordance with the invention is characterized in that the at least one secondary antioxidant is selected from the group comprising phosphorus compounds, in particular phosphites and phosphonites, organo-sulfur compounds, in particular sulfides and disulfides, and mixtures thereof.

For example, the following may be used as phosphites or phosphonites:

triphenylphosphite, diphenylalkylphosphite, phenyldialkylphosphite, tri(nonylphenyl)phosphite, trilaurylphosphite, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-dicumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoidiphosphite, bis(2,4,6-tris(tert-butylphenyl)pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenz[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

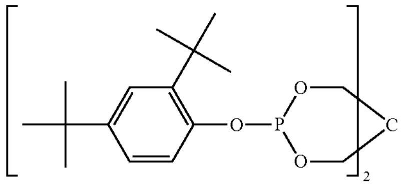

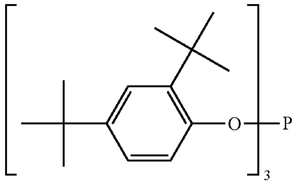

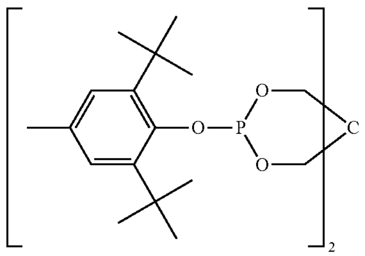

-continued
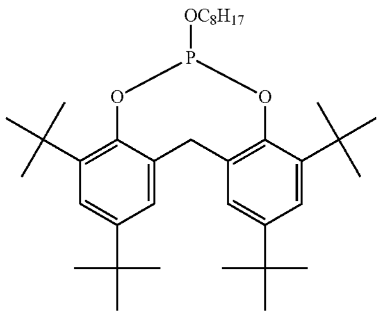
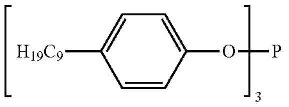
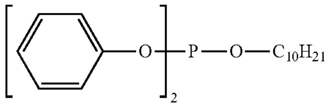
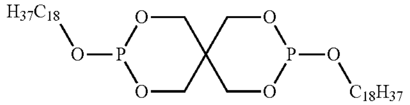
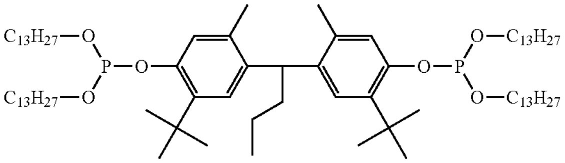
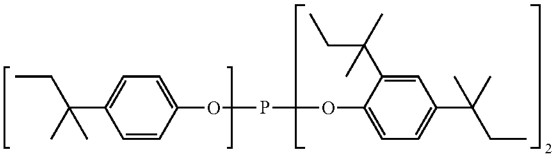
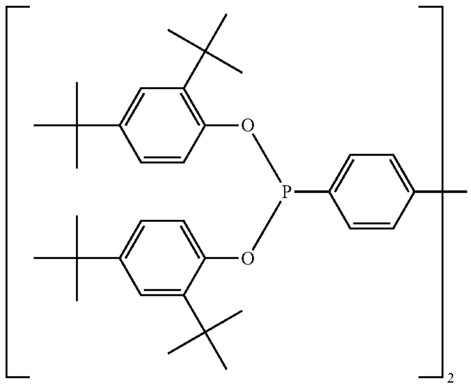
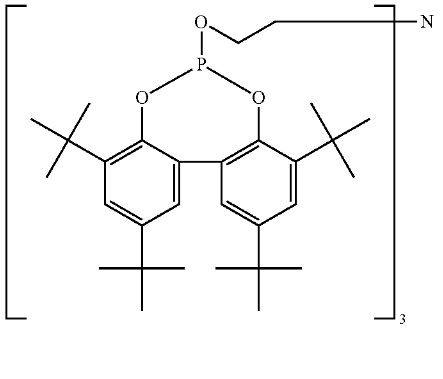
-continued
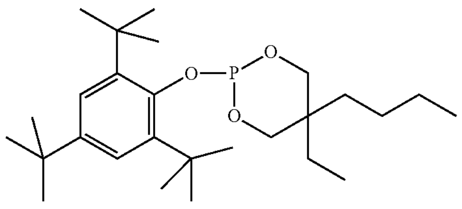
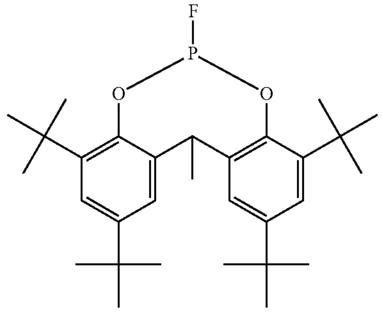
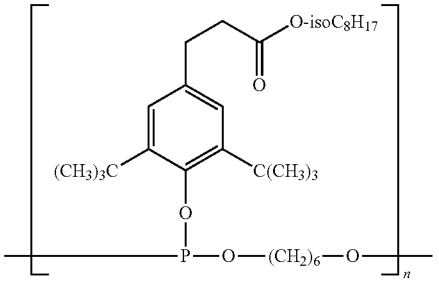
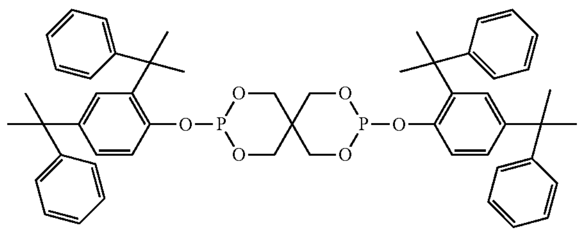
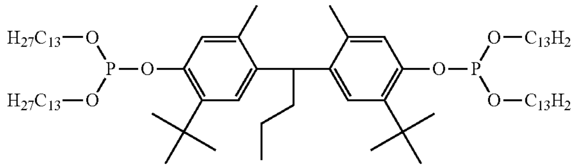
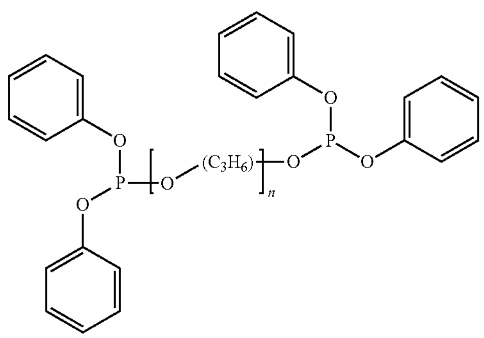

-continued

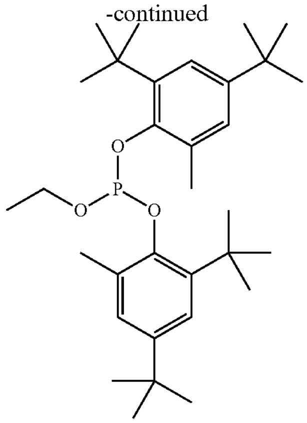

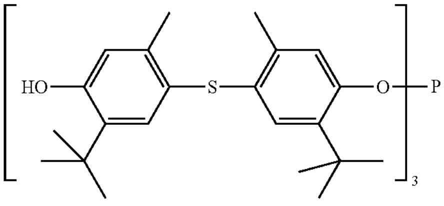

The phosphite tris-(2,4-d-tert-butylphenyl)phosphite is particularly preferably used as the secondary antioxidant.

Preferred sulfur compounds are:

distearylthiodipropionate, dilaurylthiodipropionate; ditridecyldithiopropionate, ditetradecylthiodipropionate, 3-(dodecylthio)-1,1'-[2,2-bis[[3-(dodecylthio)-1-oxopropoxy]methyl]-1,3-propandiyl]propanoic acid ester.

Sulfur compounds having the following structures are particularly preferably used.

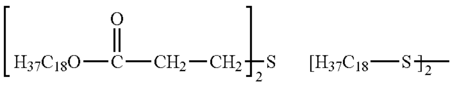

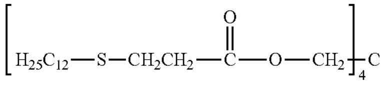

In the event that both a primary and a secondary antioxidant are used in the method, it is preferred if component (B) (primary antioxidant) is a phenolic antioxidant and component (C) (secondary antioxidant) s a phosphite or a phosphonite.

In a further preferred embodiment, components (B) and (C) comprise a sustainable natural resource.

In accordance with a further preferred variant of the method in accordance with the invention, component (A) is introduced into the halogen-free thermoplastic recyclate in a weight ratio to component (8) and/or component (C) of 90:10 to 10:90, preferably of 80:20 to 20:80, particularly preferably of 60:40 to 40:60.

It is furthermore advantageous that, in each case relative to the weight sum of the plastic recyclate and of component (A) to (C), 0.02 to 3.00 wt %, preferably 0.03 to 1.00 wt %, particularly preferably 0.02 to 0.50 wt %, in particular 0.10 to 0.30 wt %, of the at least one compound (A) enabled to react with carbonyl groups, and 0.02 to 3.00 wt %, preferably 0.03 to 1.00 wt %, particularly preferably 0.02 to 0.50 wt %, in particular 0.05 to 0.20 wt %, of the at least one primary antioxidant (B), and/or 0.02 to 3.00 wt %, preferably 0.03 to 1.00 wt %, particularly preferably 0.02 to 0.50 wt %, in particular 0.05 to 0.20 wt % of the at least one secondary antioxidant (C) are introduced into the halogen-free thermoplastic recyclate.

Components (A) and (B) and/or (C) can thereby be introduced into the halogen-free thermoplastic recyclate such that the components (A) and (B) and/or (C) present as solids are mixed with the halogen-free thermoplastic recyclate present as a solid and the mixture thereby produced is melted and subsequently cooled or the components (A) and (B) and/or (C) present as solids and the melt thereby produced are introduced into a melt of the halogen-free thermoplastic recyclate.

Components (A) (B) and/or (C) that can be present as a powder, compacted, as pellets, a solution, or flakes, are preferably mixed with the polymer to be stabilized, the polymer matrix is transferred to the melt and is subsequently cooled. Alternatively to this, it is equally possible to introduce the additive into a polymer melt in a molten state.

The halogen-free thermoplastic recyclate is preferably selected from the group comprising a) recycled polymers of olefins or diolefins such as polyethylene, in particular LDPE, LLDPE, VLDPE, ULDPE, MDPE, HDPE, and UHMWPE, metallocene PE (m-PE), polypropylene, polyisobutylene, poly-4-methyl-pentene-1, polybutadiene, polyisoprene, polycyclooctene, polyalkylene-carbon monoxide copolymers, and corresponding copolymers in the form of statistical or block structures such as polypropylene-polyethylene (EP), EPM or EPDM, ethylene-vinyl acetate (EVA), ethylene-acrylic ester such as ethylene butyl acrylate, ethylene-acrylic acid glycidyl acrylate, and corresponding graft polymers such as polypropylene maleic acid anhydride, polypropylene-g-acrylic acid, and polyethylene-g-acrylic acid,
b) recycled polystyrene, polymethyl styrene, polyvinyl naphthalene, styrene butadiene (SB), styrene butadiene styrene (SBS), styrene ethylene butylene styrene (SEBS), styrene ethylene propylene styrene, styrene isoprene, styrene isoprene styrene (SIS), styrene butadiene acrylonitrile (ABS), styrene acrylonitrile acrylate (ASA), styrene ethylene, styrene maleic acid anhydride polymers, including corresponding graft copolymers such as styrene on butadiene, maleic acid anhydride on SBS or SEBS, and graft copolymers of methyl methacrylate, styrene butadiene, and ABS (MABS),
c) recycled polymers of unsaturated esters such as polyacrylates and polymethacrylates such as polymethyl methacrylate (PMMA), polybutyl acrylate, polyauryl acrylate, poly stearyl acrylate, polyacrylonitrile, polyacrylamides, copolymers such as polyacrylonitrile-poly alkyl acrylate,
d) recycled polymers of unsaturated alcohols and derivatives such as polyvinyl alcohol, polyvinyl acetate, polyvinyl butyral,
e) recycled polyacetates such as polyoxymethylene (POM), and corresponding copolymers such as copolymers with butanal,
f) recycled polyphenylene oxides and blends with polystyrene or polyamides,
g) recycled polymers of cyclic ethers such as polyethylene glycol, polypropylene glycol, polyethylene oxide, polypropylene oxide,
h) recycled polyurethanes of hydroxy terminated polyethers or polyesters and aromatic or aliphatic isocynates, in particular linear polyurethanes, polyureas,
i) recycled polyamides such as polyamide-6, 6.6, 6.10, 4.6, 4.10, 6.12, 12.12, polyamide 11, polyamide 12 and (semi) aromatic polyamides such as polyphthalamides, e.g. prepared from terepththalic acid and/or isophthalic acid and aliphatic diiamines or from aliphatic dicarboxylic acids such as adipic acid or sebacic acid and aromatic diamines such as 1,4- or 1,3-diaminobenzol, j) recycled polyamides, polyamide imides, polyether imides, polyester imides, poly(ether)ketones, polysulfones, polyether sulfones, polyaryl sulfones, polyphenylene sulfides, polybenzimide azoles, polyhydantoines, k) recycled polyesters of aliphatic or aromatic dicarboxylic acids and diols or of hydroxy carboxylic acids such as polyethylene terephthalate (PET), polybutylene terephthalate (PBT), polypropylene terphthalate, polyethylene napththylate, poly-1,4-dimethylocyclohexane terephthalte, polyhydroxy benzoate, polyhydroxy napththalate, polylactic acid, l) recycled polycarbonates, polyester carbonates, and blends thereof such as PC/ABS, PC/PBT, PC/PET/PBT, m) recycled cellulose derivatives such as cellulose nitrate, cellulose acetate, cellulose propionate, cellulose butyrate, n) and mixtures, combinations, or blends of two or more of the above-named polymers.

For the case that further components are added to the halogen-free thermoplastic recyclate, they can be admixed to the polymers separately, in the form of liquids, powders, pellets, or compacted products, or together with the additive composition in accordance with the invention as described above.

At least one additive can preferably additionally be introduced into the halogen-free thermoplastic recyclate that is selected from the group comprising UV absorbers, light stabilizers, metal deactivators, filler deactivators, antiozonants, nucleation agents, anti-nucleation agents, toughening agents, plasticizers, lubricants, rheological modifiers, thixotropic agents, chain extenders, optical brighteners, antimicrobial active agents (e.g. biocides), antistatic agents, slip agents, anti-blocking agents, coupling agents, crosslinking agents, branching agents, anti-cross-linking agents, hydrophilization agents, hydrophobing agents, bonding agents, dispersing agents, compatibilizers, oxygen scavengers, acid scavengers, expanding agents, degradation additives, defoaming agents, odor scavengers, marking agents, anti-fogging agents, additives to increase the electrical conductivity and/or thermal conductivity, infrared absorbers or infrared reflectors, gloss improvers, matting agents, repellents, fillers, reinforcement materials, and mixtures thereof.

It is further preferred that at least one additive is additionally introduced into the halogen-free thermoplastic recyclate that is selected from the group comprising a) acid scavengers, preferably calcium stearate, magnesium stearate, zinc stearate, aluminum stearate, calcium stearate, calcium lactate, calcium stearoyl-2-lactate, hydrotalcites, in particular synthetic hydrotalcites on a basis of aluminum, magnesium, and zinc, hydrocalumites, zeolites, alkaline earth oxides, in particular calcium oxide and magnesium oxide, alkaline earth carbonates, in particular calcium carbonate, magnesium carbonate, and dolomite, and hydroxides, in particular brucite, b) light stabilizers, in particular light stabilizers from the group of hindered amines, that can simultaneously act as long term heat stabilizers, c) dispersing agents, d) filler deactivators, and mixtures hereof.

Suitable light stabilizers are, for example, compounds based on 2-(2'-hydroxyphenyl) benzotriazoles, 2-hydroxy benzophenones, esters of benzoic acids, acrylates, oxamides, and 2-(2-hydroxyphenyl)-1,3,-5-triazines.

Suitable 2-(2'-hydroxyphenyl)benzotriazoles are, for example, 2-(2'-hydroxy-5'methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxy-phenyl) benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole; 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the product of the transesterification of 2-[3'-tert-butyl-5'-(2-methoxycarbonylethyl)-2'-hydroxyphenyl]-2H-benzotriazole with polyethyleneglycol 300; $[R—CH_2CH_2—COO—CH_2CH_2—]—_2$, where R=3'-tert-butyl-4'-hydroxy-5'-2H-benzotriazole-2-ylphenyl, 2-[2'-hydroxy-3'-(α,α-dimethylbenzyl)-5'-(1,1,3,3-tetramethylbutyl)phenyl]benzotriazole 2-[2'-hydroxy-3'-(1,1,3,3-tetramethylbutyl)-5'-(α,α-dimethylbenzyl)phenyl] benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethoxy derivatives of the 2-hydroxy benzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are, for example, 4-tert-butylphenylsalicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazin, 3-salicyloylamino-1,2,4-triazole, bis(benzylidene)oxalyidihydrazide, oxanilide, isophthaloyldihydrazide, sebacoyl-bis-phenylhydrazide, N,N'-diacetyladipoyldihydrazide, N,N'-bis(salicyloyl)oxylyldihydrazide, N,N'-bis(salicyloyl)thiopropionyldihydrazide.

Suitable hindered amines that can simultaneously act as long term stabilizers are, for example, 1,1-bis(2,2,6,6-tetramethyl-4-piperidyl)succinate, bis(1,2,2,6,6-pentamethyl-4-piperidyl)sebazate, bis(1-octyloxy-2,2,6,6-tetramethyl-4-piperidyl)sebazate, 1-cyclohexyloxy-2,2,6,6-tetramethyl-4-octadecyl aminopiperidine, bis(1-acyl-2,2,6,6-tetramethyl piperidine-4-yl)sebazate 1-(2-hydroxy-methylpropoxy)-4-hydroxy-2,2,6,6-tetramethylpiperidine,1-(2-hydroxy-2-methylpropoxy)-4-oxo-2,2,6,6-tetramethylpiperidine, bis(1-octyloxy-2,2,6,6-tetramethylpiperidyl)succinate, N,N'-bis-formyl-N,N'-bis(2,2,6,6-tetramethyl-4-piperidyl) hexamethylenediamine, (33a) bis(1-undecanyloxy-2,2,6,6-tetramethylpiperidine-4-yl)carbonate,1,2,2,6,6-pentamethyl-4-aminopiperidine,2-undecyl-7, 7,9,9-tetramethyl-1-oxa-3,8-diaza-4-oxo-spiro[4,5]decane-tris(2,2,6,6-tetramethyl-4-piperidyl)nitrilotriacetate1,1'-(1,2-ethanediyl)-bis(3,3,5,5-tetramethylpiperazinone), 3-n-octyl-7, 7,9,9-tetramethyl-1,3,8-triazaspiro[4.5]decane-2,4-dione, 8-acetyl-3-dodecyl-7,7,9,9-tetramethyl-1,3,8-triazaspiro[4.5]decane-2,4-dione,3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylendiamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butantetracarboxylate, 1,1'-(1,2-ethandiyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylendiamine and 4-morpholino-2,6-dichloro-1,3,5-triazin e, the reaction product of 7,7,9,9-tetramethyl-2-cycloundecyl-1-oxa-3,8-diaza-4-oxospiro-[4,5]decane and epichlorhydrine.

The sterically hindered N—H, N-alkyls such as N-methyl or N-octyl, the N-alkoxy derivatives such as N-methoxy or N-octyloxy, the cycloalkyl derivatives such as N-cyclohexyloxy and the N-(2-hydroxy-2-methylpropoxy) analogs are also each included in the above-given structures here.

Preferred hindered amines also have the following structures:

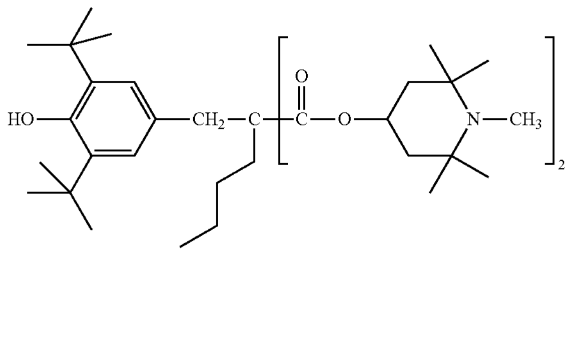

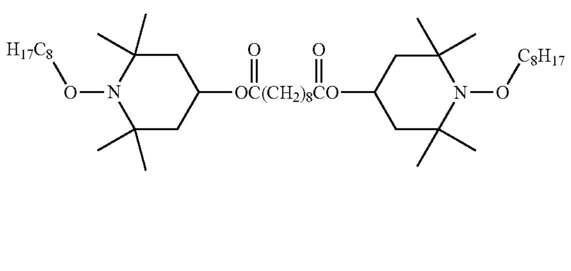

-continued
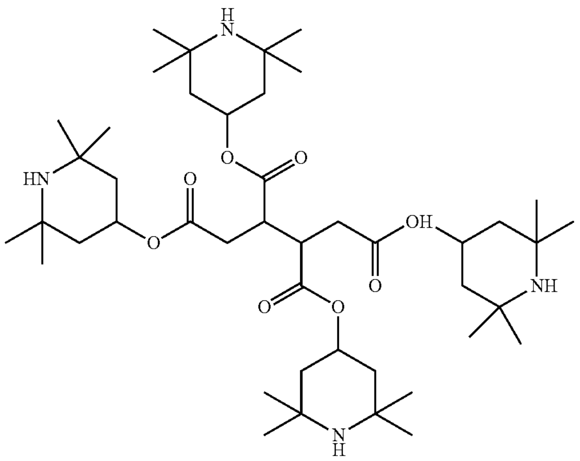
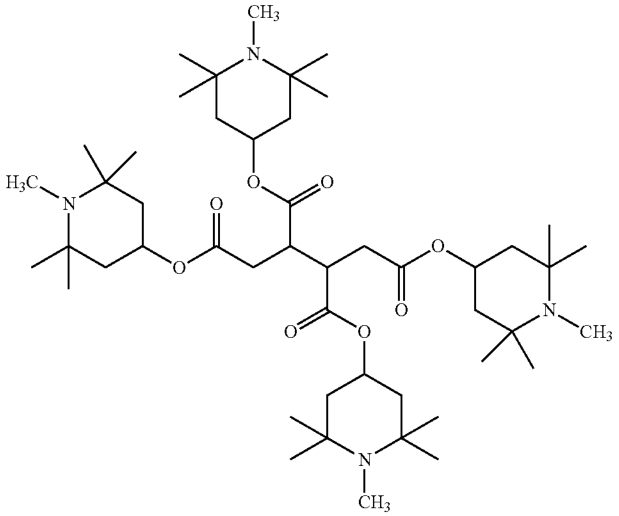
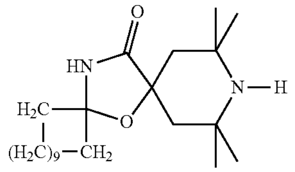
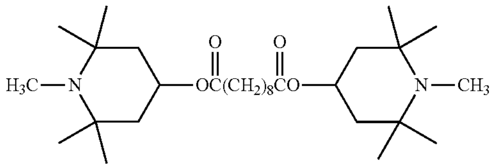
I
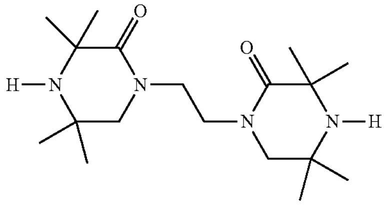
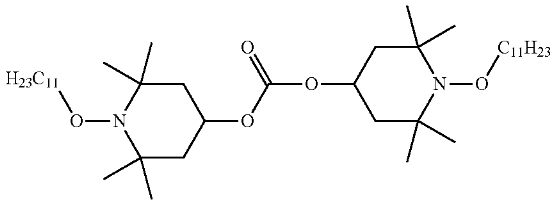
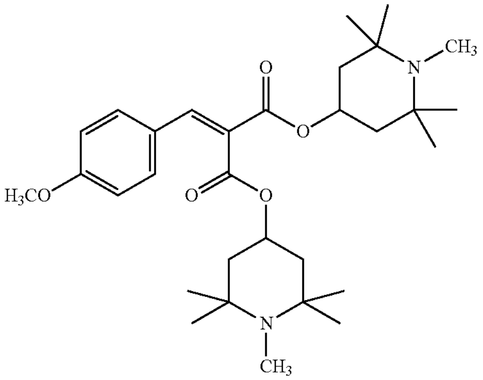

-continued
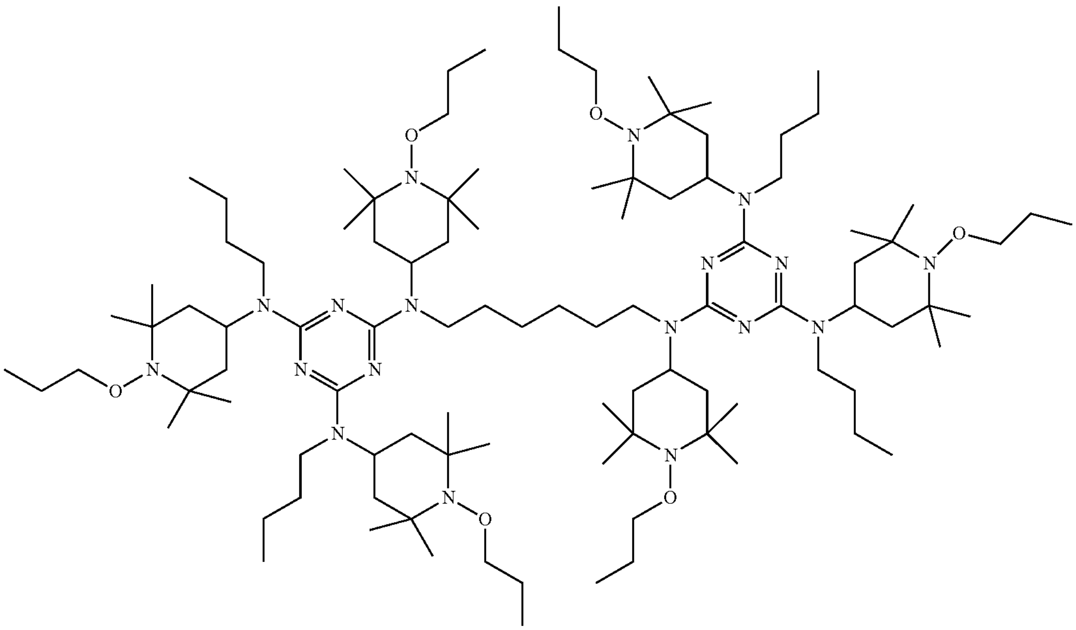
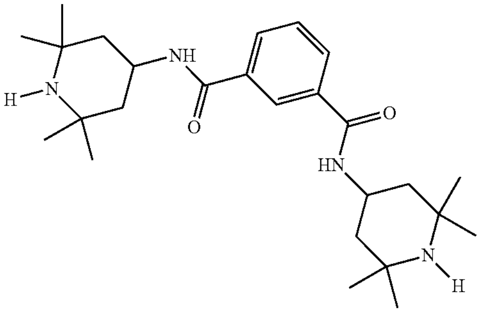
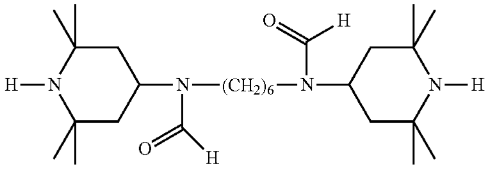
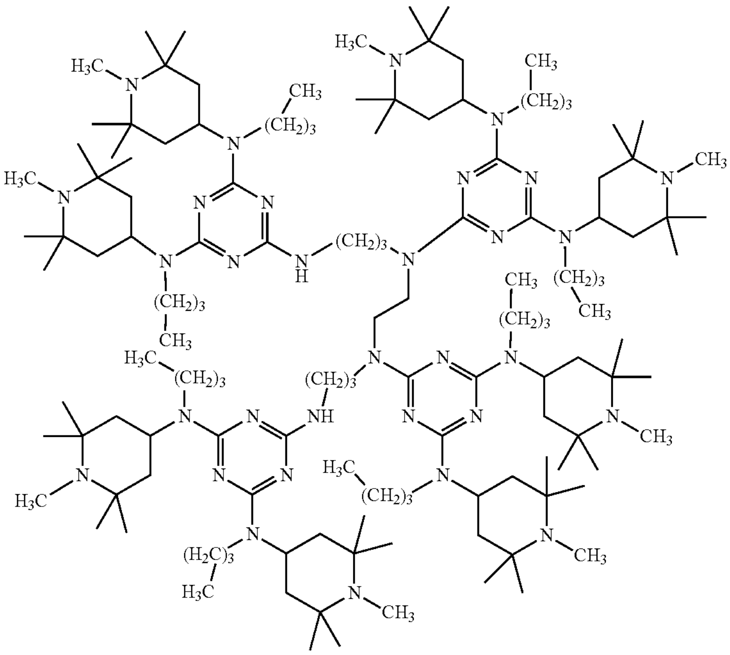

-continued
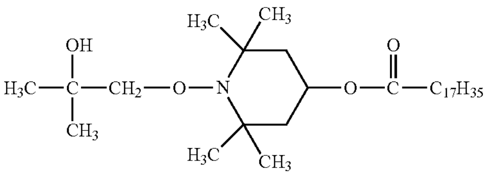
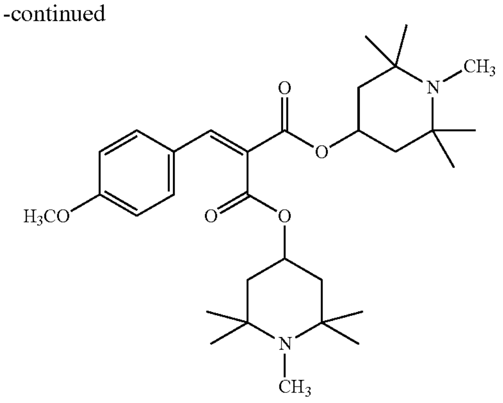
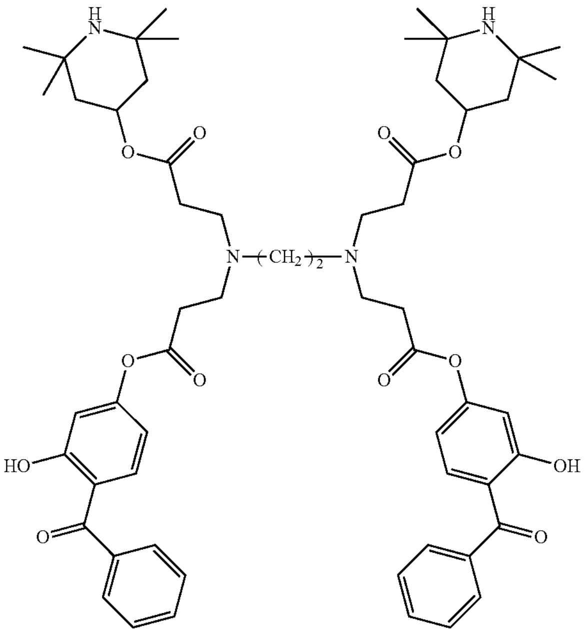
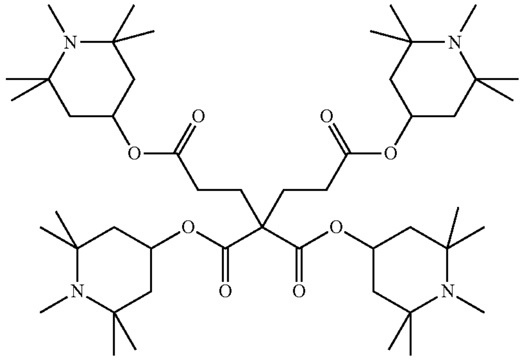
Preferred oligomeric and polymeric hindered amines have the following structures:
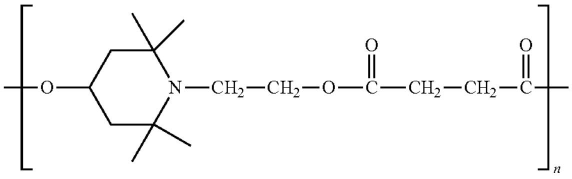

-continued
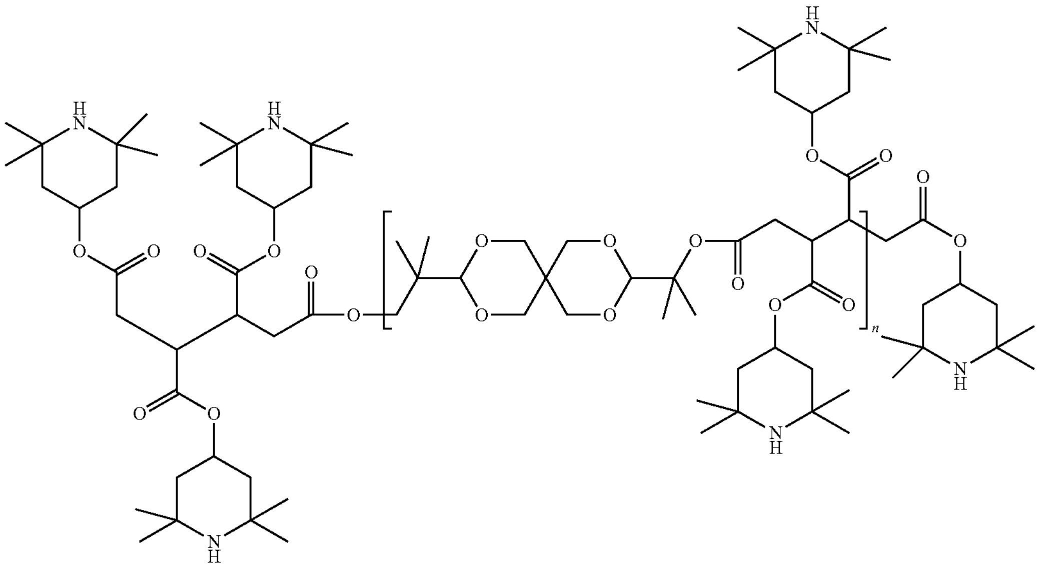
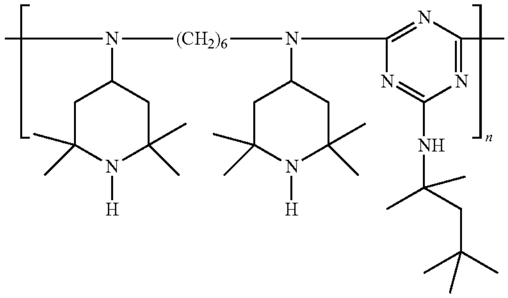
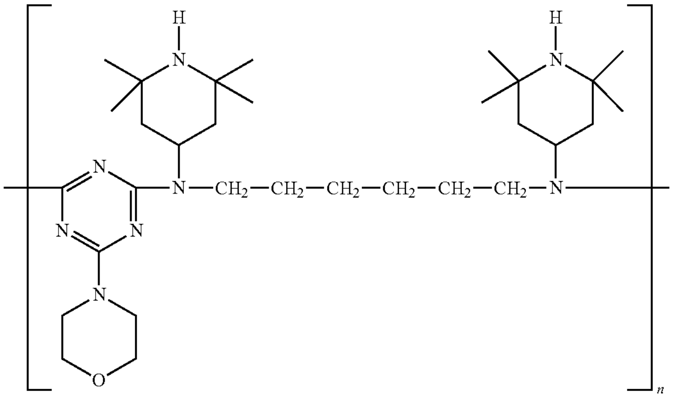
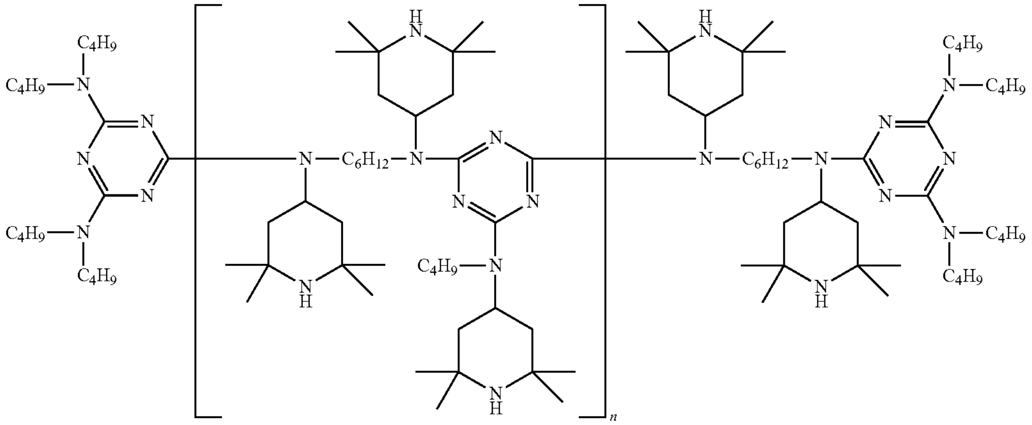

-continued
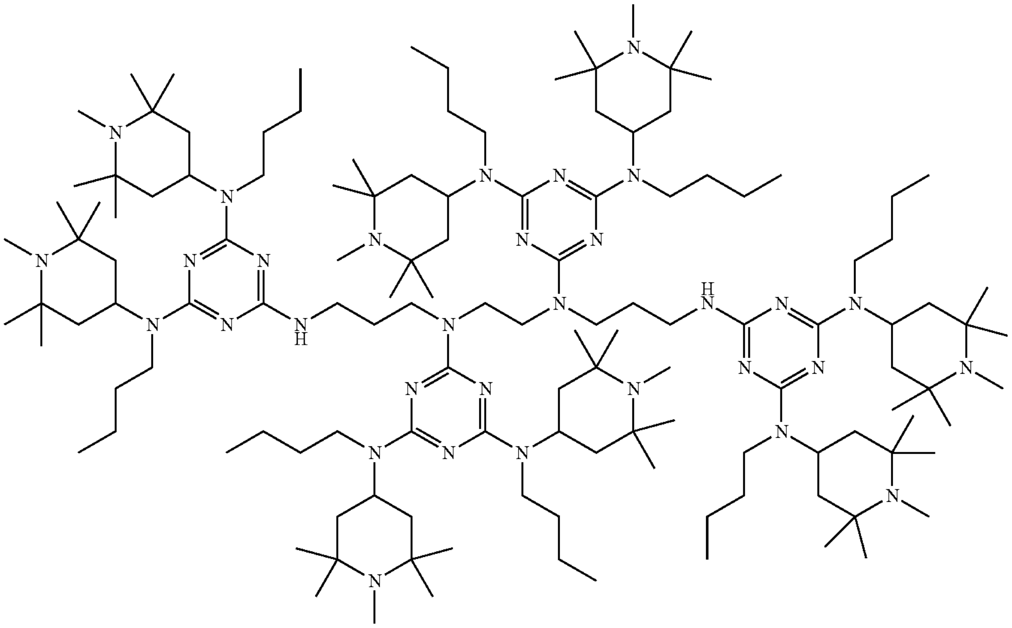
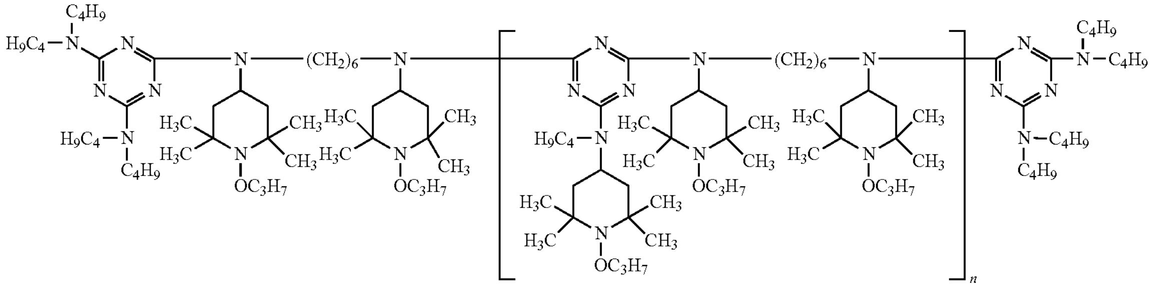
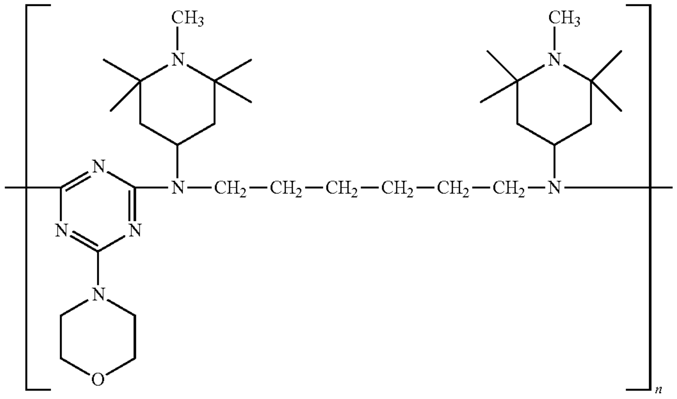
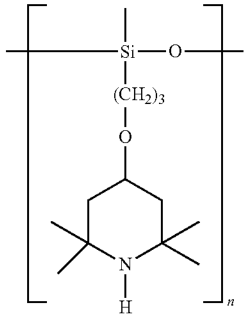
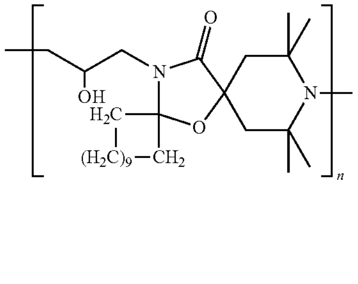
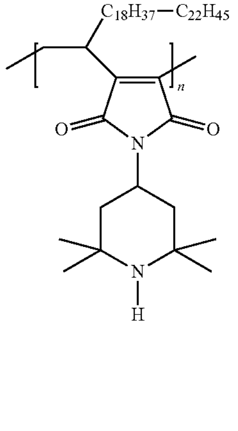

In the aforementioned compounds, n in each instance means 3 to 100.

Suitable dispersion agents are, for example: polyacrylates, e.g. copolymers with long-chain side groups, polyacrylate block copolymers, alkylamides: e.g. N,N'-1,2-ethanediylbisoctadecanamide sorbitan ester, e.g. monostearylsorbitan esters, titanates and zirconates, reactive copolymers having functional groups, e.g. polypropylene-co-acrylic acid, polypropylene-co-maleic acid anhydride, polyethylene-co-glycidylmethacrylate, polystyrene-alt-maleic acid anhydride-polysiloxanes: e.g. dimethylsilandiole-ethylene-oxide copolymers, polyphenylsiloxane copolymers, amphiphilic copolymers: e.g. polyethylene-block-polyethylene oxide, dendrimers, e.g. dendrimers containing hydroxyl groups.

Suitable nucleation agents are, for example, talcum, alkali or alkaline earth salts of monofunctional and polyfunctional carboxylic acids such as benzoic acid, succinic acid, adipic acid, e.g. sodium benzoate, zinc glycerolate, aluminum hydroxy-bis(4-tert-butyl)benzoate, benzylidene sorbitols such as 1,3:2,4-Bis(benzylidene)sorbito, 1,3:2,4-bis(4-methylbenzylidene)sorbitol, 2,2'-methylene-bis-(4,6-di-butylphenyl)phosphate, and trisamides and diamides such as trimesic acid tricyclohexylami, trimesic acid tri(4-methyl-cyclo-hexylamide), trimesic acid tri(tert.butylamid), N,N',N''-1,3,5-benzoltriyltris(2,2-dimethyl-propanamide) or 2,6-naphthalindicarboxylic acid-cyclohexylamide.

Suitable antinucleation agents are, for example, azine dyes such as nigrosine, ionic liquids and/or lithium salts.

Suitable flame retardant agents are, for example:

a) Inorganic flame retardant agents such as $Al(OH)_3$, $Mg(OH)_2$, AilO(OH), $MgCO_3$, sheet silicates such as montmorillonite or sepiolite, unmodified or organically modified double salts such as Mg—Al silicates, POSS (polyhedral oligomeric silsesquioxanes) compounds, huntite hydromagnesite or halloysite and $Sb_2O_3$, $Sb_2O_5$, $MoO_3$, zinc stannate, zinc hydroxystannate, b) flameproofing agents containing nitrogen such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phosphate, and the corresponding pyrophosphates and polyphosphates, poly-[2,4-(piperazine-1,4-yl)-6-(morpholine-4-yl)-1,3,5-triazine], ammonium polyphosphate, melamine borate, melamine hydrobromide, c) radical formers, such as alkoxyamines, hydroxylamine esters, azo compounds, sulfene amides, sulfene imides, dicumyl or polycumyl, hydroxyimide and derivatives thereof such as hydroxyimide esters or hydroxyimide ethers, d) Flame retardant agents containing phosphorus such as red phosphorus, phosphates such as resorcin diphosphate, bisphenol-A-diphosphate, and their oligomers, triphenylphosphate, ethylene diamine diphosphate, phosphinates such as hypophosphorous acid and their derivatives such as alkylphosphinate salts, e.g. diethylphosphinate aluminum or diethylphosphinate zinc or aluminum phosphinate, aluminum phosphite, aluminum phosphonate, phosphonate esters, oligomer and polymer derivatives, of the methane phosphonic acid, 9,10-dihydro-9-oxa-10-phosphorylphenanthrene-10-oxide (DOPO) and their substituted compounds, e) halogenated flameproofing agents based on chlorine and bromine such as polybrominated diphenyl oxides such as decabromodiphenyloxide, tris(3-bromo-2,2-bis(bromomethyl)propyl-phosphate, tris(tribromoneopentyl)phosphate, tetrabromophthalic acid, 1,2-bis(tribromophenoxy)ethane, hexabromocyclododecane, brominated diphenylethane, tris-(2,3-dibrompropyl) isocyanurate, ethylene-bis-(tetrabronophthalimide), tetrabromo-bisphenol A, brominated polystyrene, brominated Polybutadiene or polystyrene brominated polybutadiene copolymers, brominated polyphenylene ether, brominated epoxy resin, polypentabromobenzylacrylate, optionally in combination with $Sb_2O_3$ and/or $Sb_2O_5$, f) borates such as zinc borate or calcium borate, optionally on a carrier material such as silica g) sulfurous compounds, such as elemental sulfur, disulfides and polysulfides, thiuram sulfide, dithiocarbamates, mercaptobenzothiazole and sulfene amides, h) anti-drip agents, such as polytetrafluoroethylene, i) silicon-containing compounds, such as polyphenyl siloxanes, j) carbon modifications, such as carbon nanotubes (CNTs), expandable graphite or graphene k) and combinations or mixtures thereof.

Suitable plasticizers are, for example, phthalic acid esters, adipic acid esters, esters of citric acid, esters of 1,2-cyclohexane dicarboxylic acid, trimellitic acid esters, isorobide esters, phosphate esters, epoxides such as epoxidized soy bean oil, or aliphatic polyesters.

Suitable fillers and reinforcements are, for example, synthetic or natural materials such as calcium carbonate, silicates; glass fibers, glass spheres (solid or hollow), talcum, dolomite, micra, feld spar, kaolin, quartz, wollastonite, calcium sulfate, barium sulfate, carborundum, metal oxides and metal hydroxides, aluminum silicate, carbon silicate, zirconium silicate, black carbon, graphite, carbon nanotubes, graphene, wood flour, or fibers of natural products such as cellulose or synthetic fibers. Further suitable fillers are hydrotalcites or zeolites or phyllosilicates such as montmorillonite, bentonite, beidellite, mica, hectorite, saponite, vermiculite, ledikite, magadite, illite, kaolinite, wollastonite, attapulgite.

Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, chinophthalones, diketoptyrrolopyrrols, dioxazines, indanthrones, isoindolines, isoindolinones; azo compounds, perinones, perylenes, phthalocyanines or pyranthrones. Further suitable pigments include effect pigments on a metal base or pearl gloss pigments on a metal oxide base.

Suitable chain extenders for the linear molecular weight structure of polycondensation polymers such as polyesters or polyamides are, for example, diepoxides, bis-oxazonlines, bis-oxazolones, bis-oxazines, diisoscyanates, dianhydrides, bis-acyllactams, bis-maleimides, dicyanates, carbodiimides. Further suitable chain extenders include polymer compounds such as polystyrene polyacrylate polyglycidyl (meth)acrylate copolymers, polystyrene maleic acid anhydride copolymers, and polyethylene maleic acid anhydride copolymers.

Suitable optical brighteners are, for example, bis-benzoxazoles, phenylcumarines, or bis(styryl)biphenyls and in particular optical brighteners of the formulas:

-continued
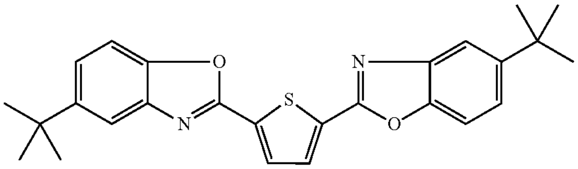
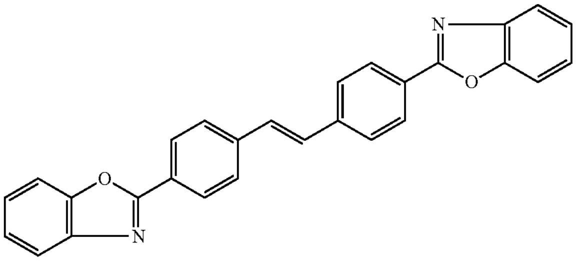
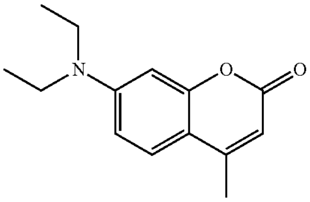
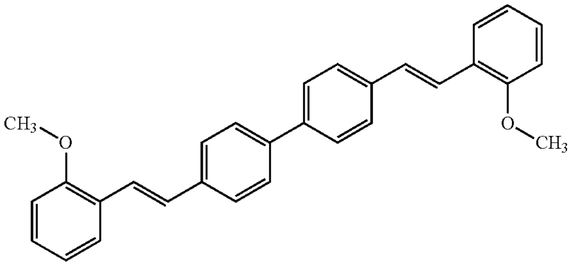
Suitable filler deactivators are, for example, polysiloxanes, polyacrylates, in particular block copolymers such as polymethacrylic acid polyalkyene oxide or polyglycidyl (meth)acrylates and their copolymers, e.g. with styrene and epoxides of e.g. the following structures:
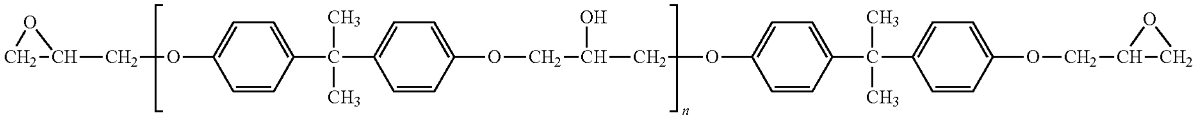
n = 1-10
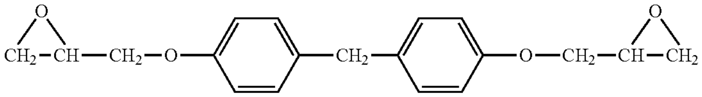
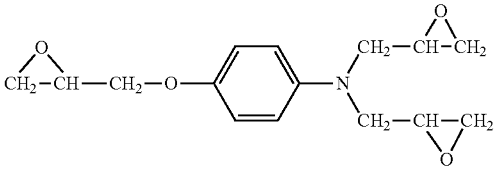
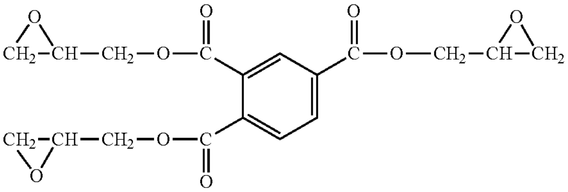
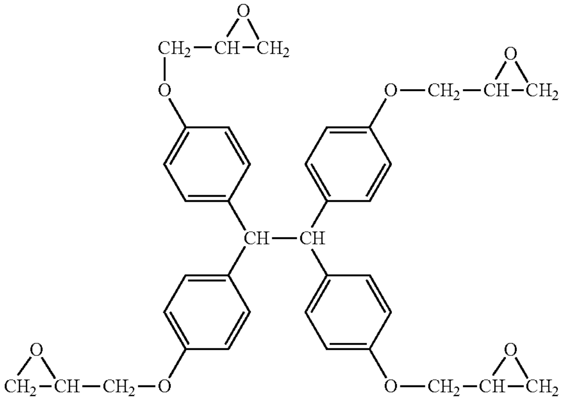
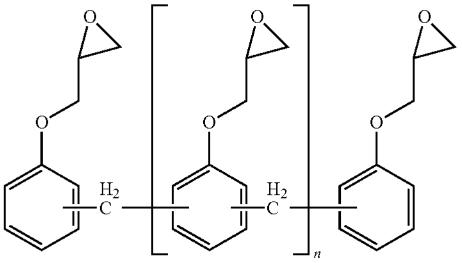
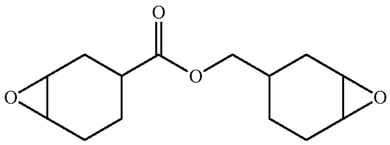
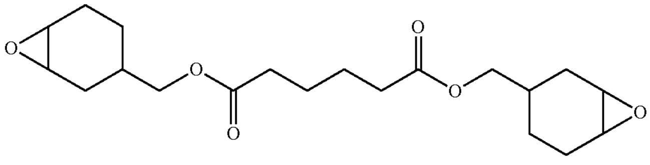

Suitable antistatic agents are, for example, ethoxylated alkylamines, fatty acid esters, alkylsulfonates, and polymers such as polyetheramides.

Suitable antiozonants are the above-mentioned amines, such as N,N'-di-isopropyl-p-phenylene diamine, N,N'-di-sec-butyl-p-phenylene diamine, N,N'-bis(1,4-dimethylpentyl)-p-phenylene diamine, N,N'-dicyclohexyl-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine.

Suitable additives to increase the electrical conductivity are, for example, the mentioned static inhibitors, black carbon, and carbon compounds such as carbon nanotubes and graphene, metal powders such as copper powder, and conductive polymers such as polypyrroles, polyanilines, and polythiopenes. Suitable additives to increase thermal conductivity are, for example, aluminum nitrides and boron nitrides.

Suitable demolding agents are, for example, silicones, soaps, and waxes, such as montan waxes.

The working in of components (A) and (B) and optionally of the additional additives into the plastic recyclate takes plate by typical processing methods, with the polymers being melted and being mixed with the additive composition in accordance with the invention and the optionally further additives, preferably by mixers, kneaders and extruders. Extruders, such as single-screw extruders, twin-screw extruders, planetary gear extruders, ring extruders, co-kneaders, are preferred processing machines and are preferably equipped with a vacuum degassing means. The processing can take place under air or optionally under inert gas conditions such as under nitrogen.

Components (A), (B) and/or (C) can furthermore be included, manufactured and introduced in the form of so-called master batches or concentrates that, for example, comprise 10-90% of a stabilizer composition comprising components (A) and (B) and/or (C) in a polymer.

In a second aspect, the present invention relates to a plastic composition comprising or consisting of (A) at least one compound enabled to react with carbonyl groups, in combination with (B) at least one primary antioxidant and/or (C) at least one secondary antioxidant, in a halogen-free thermoplastic recyclate, wherein the plastic composition is free of alditols and cyclitols.

All of the previously made preferred embodiments and aspects named in connection with the method in accordance with the invention also apply without limitation to the previously described plastic composition.

A preferred embodiment provides that component (A) is included in the plastic composition in a weight ratio to component (B) and/or component (C) of 90:10 to 10:90, preferably of 80:20 to 20:80, particularly preferably of 60:40 to 40:60.

It is furthermore advantageous that, in each case relative to the weight sum of the plastic recyclate and of component (A) to (C), 0.02 to 3.00 wt %, preferably 0.03 to 1.00 wt %, particularly preferably 0.02 to 0.50 wt %, in particular 0.10 to 0.30 wt %, of the at least one compound (A) enabled to react with carbonyl groups, and 0.02 to 3.00 wt %, preferably 0.03 to 1.00 wt %, particularly preferably 0.02 to 0.50 wt %, in particular 0.05 to 0.20 wt %, of the at least one primary antioxidant (B), and/or 0.02 to 3.00 wt %, preferably 0.03 to 1.00 wt %, particularly preferably 0.02 to 0.50 wt %, in particular 0.05 to 0.20 wt %, of the at least one secondary antioxidant (C) are included in the halogen-free thermoplastic recyclate.

It is furthermore of advantage if at least one compound (A) enabled to react with carbonyl groups, at least one primary antioxidant (B) and at least one secondary antioxidant (C) are included.

At least one halogen-free thermoplastic recyclate is in particular a polyolefin recyclate, in particular a polypropylene recyclate or a polyethylene recyclate.

The previously presented plastic composition can in particular be manufactured using an initially described method in accordance with the invention.

The invention additionally relates to a molding compound or a molded part that can be manufactured from the previously described plastic composition. Preferred embodiments of the molding compound or molded part provide injection molded parts, foils, films, lacquers, coatings, foams, fibers, cables, tubes, profiles, hollow bodies, ribbons, membranes, e.g. geo-membranes, lubricants, colorants, and/or adhesives that are manufactured by extrusion, injection molding, blow molding, calendering, pressing processes, spinning processes, and or rotomolding, e.g. for the electrical industry, for the construction industry, for the transport industry, for medical applications, for domestic and electrical appliances, for vehicle parts, for consumer products, for packaging, for furniture, and/or for textiles.

The present invention further relates to a stabilizer composition for stabilizing halogen-free thermoplastic recyclates against oxidative, thermal, and/or actinic degradation, consisting of (A) at least one compound enabled to react with carbonyl groups, in combination with (B) at least one primary antioxidant and/or (C) at least one secondary antioxidant, where the stabilizer composition is free of alditols and cyclitols.

A preferred embodiment relating to the stabilizer composition provides that component (A) is included in the plastic composition in a weight ratio to component (B) and/or component (C) of 90:10 to 10:90, preferably of 80:20 to 20:80, particularly preferably of 60:40 to 40:60.

The stabilizer composition in particular consists of at least one compound (A) enabled to react with carbonyl groups, at least one primary antioxidant (B), and at least one secondary antioxidant (C).

It is furthermore advantageous that the stabilizer composition consists of (A) 90.00 to 10.00 wt %, or 80.00 to 20.00 wt %, preferably 60.00 to 40.00 wt %, of at least one compound enabled to react with carbonyl groups with the exception of alditols and cyclitols, in combination with (B) 10.00 to 90.00 wt %, preferably 20.00 to 30.00 wt %, of at least one primary antioxidant, and/pr (C) 10.00 to 90.00 wt %, preferably 20.00 to 30.00 wt %, of at least one secondary antioxidant.

The present invention additionally relates to the use of the previously described stabilizer compositions, for stabilizing halogen-free thermoplastic recyclates against oxidative, thermal, and/or actinic degradation.

Suitable compounds (C) are preferably selected such that they are not volatile or are only a little volatile at the typical processing temperatures of polymers. Typical processing temperatures of the preferred polyolefin recyclates are, for example, between 180° C. and 250° C.

The present invention will be explained with reference to the following examples without restricting the invention to the specific parameters shown.

A post consumer polypropylene recyclate from accumulator box ground stock (supplier: BSB Braubach) together with the additives given in the Table was conveyed in a circle in the melt at 210° C. in a twin screw microextruder (MC 5, manufacturer DSM) in continuous mode at 90 revolutions a minute for 30 minutes to check the effect of the stabilizer composition in accordance with the invention. The force absorption is measured in each case after 10, 20, and 30 minutes. The force is a measure for the toughness of the melt and thus for the molecular weight. The higher the remaining force (after a melting time of 2 minutes=100%), the smaller the degradation of the polymer.

TABLE 1

Stabilization of polypropylene recyclate

| | Post-stabilization | Residual force after 10/20/30 minutes [%] |
|---|---|---|
| Comparison example 1 | Without additive | 81/62/44 |
| Comparison example 2 | 0.1% AO-1 + 0.1% P-1 | 94/91/82 |
| Example 1 in accordance with the invention | 0.1% AO-1 + 0.1% P-1 + 0.2% hydantoin | 96/95/94 |

AO-1: Pentaerythritol-tetrakis [3-(3,5-di-tert-butyl-4-hydroxyphenyl)propionate
P-1: Tris-(2,4-di-tert-butylphenyl)phosphite The synergistic combination in accordance with the invention has proven superior in the present test to the synthetic commercial synergistic combinations of AO-1 and P-(Comparison example 1) since there is a smaller degradation of the polymer over the experiment time.

TABLE 2

Stabilization of polypropylene recyclate

| | Additive | Residual force after 30 minutes [%] |
|---|---|---|
| Comparison example 3 | w/o | 45 |
| Example 2 in accordance with the invention | 0.1% AO-1 + 0.1% P-1 + 0.2% octadecanethiol | 84 |
| Example 3 in accordance with the invention | 0.1% AO-1 + 0.1% P-1 + 0.2% thiohydanetoin | 93 |
| Example 4 in accordance with the invention | 0.1% AO-1 + 0.1% P-1 + 0.2% poly(vinylalcohol-co-vinylacetate) | 95 |
| Example 5 in accordance with the invention | 0.1% AO-1 + 0.1% P-1 + 0.2% poly(2-hydroxyethylmethacrylate) | 88 |

The poly(vinylalcohol-co-vinylacetate) used comprises 80% poly(vinyl) alcohol and has a molecular weight between 9,000 and 10,000.

The compositions in accordance with the invention display a smaller degradation of the polymer (higher residual force) and so an improved stabilization of the polymer.

The invention claimed is:

1. A method for stabilizing a halogen-free thermoplastic recyclate against oxidative, thermal, and/or actinic degradation, the method comprising introducing at least one compound (A) enabled to react with a carbonyl group formed by the degradation and is present as part of a polymer chain of the halogen-free thermoplastic recyclate in combination with (B) at least one primary antioxidant and/or (C) at least one secondary antioxidant, into the halogen-free thermoplastic recyclate, wherein no alditol or cyclitol is utilized, wherein the halogen-free thermoplastic recyclate is selected from the group consisting of polymer of an olefin; polymer of a diolefin; polyalkylene-carbon monoxide copolymer; ethylene-vinyl acetate copolymer; ethylene-acrylic ester copolymer; polypropylene-g-maleic acid anhydride copolymer; polypropylene-g-acrylic acid copolymer; polyethylene-g-acrylic acid copolymer; polystyrene; polymethylstyrene; polyvinyl naphthalene; styrene-butadiene copolymer; styrene-butadiene-styrene copolymer; styrene-ethylene-butylene-styrene copolymer; styrene-ethylene-propylene-styrene copolymer; styrene-isoprene copolymer; styrene-isoprene-styrene copolymer; styrene-butadiene-acrylonitrile copolymer; styrene-acrylonitrile-acrylate copolymer; styrene-ethylene copolymer; styrene-maleic acid anhydride copolymer; styrene-maleic acid anhydride graft copolymer; methyl methacrylate-styrene-butadiene graft copolymer; acrylonitrile-butadiene-styrene graft copolymer; and methacrylonitrile-butadiene-styrene graft copolymer; and wherein the at least one compound (A) is selected from the group consisting of hydroxylamine esters, oligomers and polymers having alcohol groups bound to aliphatic carbons and their copolymers with vinyl acetate, polyhydroxy(meth)acrylates, thiohydantoins, polycaprolactone-tetra-3-mercaptopropionate, and polyvinyl alcohol having a weight-average molecular weight of 1,000 to 50,000 g/mol.

2. The method in accordance with claim 1, wherein the at least one primary antioxidant (B) is selected from the group consisting of phenolic antioxidants, amines, lactones, and hydroxylamines.

3. The method in accordance with claim 1, wherein the at least one secondary antioxidant (C) is selected from the group consisting of phosphorus compounds and organo-sulfur compounds.

4. The method in accordance with claim 1, wherein the at least one compound (A), the at least one primary antioxidant (B), and the at least one secondary antioxidant (C) are introduced into the halogen-free thermoplastic recyclate.

5. The method in accordance with claim 1, wherein component (A) is introduced into the halogen-free thermoplastic recyclate in a weight ratio to component (B) and/or component (C) of 90:10 to 10:90.

6. The method in accordance with claim 1, wherein, in each case with respect to the weight sum of the halogen-free thermoplastic recyclate and components (A) to (C), 0.02 to 3.00 wt % of the at least one compound (A), and 0.02 to 3.00 wt % of the at least one primary antioxidant (B), and/or 0.02 to 3.00 wt % of the at least one secondary antioxidant (C)

are introduced into the halogen-free thermoplastic recyclate.

7. The method in accordance with claim 1, wherein components (A) and (B) and/or (C) is introduced into the halogen-free thermoplastic recyclate such that components (A), (B), and (C) present as solids are mixed with the halogen-free thermoplastic recyclate present as a solid and the mixture thereby produced is melted and subsequently cooled; or components (A), (B) and/or (C) present as solids is melted and the melt thereby produced are introduced into a melt of the halogen-free thermoplastic recyclate.

8. The method in accordance with claim 1, wherein the halogen-free thermoplastic recyclate is selected from the group consisting of polymer of an olefin; polymer of a diolefin; polyalkylene-carbon monoxide copolymer; and ethylene-vinyl acetate copolymer.

9. The method in accordance with claim 1, wherein the halogen-free thermoplastic recyclate is selected from the group consisting of ethylene-acrylic ester copolymer; polypropylene-g-maleic acid anhydride copolymer; polypropylene-g-acrylic acid copolymer; and polyethylene-g-acrylic acid copolymer.

10. The method in accordance with claim 1, wherein the halogen-free thermoplastic recyclate is selected from the group consisting of polystyrene; polymethylstyrene; polyvinyl naphthalene; styrene-butadiene copolymer; styrene-butadiene-styrene copolymer; styrene-ethylene-butylene-styrene copolymer; styrene-ethylene-propylene-styrene copolymer; styrene-isoprene copolymer; and styrene-isoprene-styrene copolymer.

11. The method in accordance with claim 1, wherein the halogen-free thermoplastic recyclate is selected from the group consisting of styrene-butadiene-acrylonitrile copolymer; styrene-acrylonitrile-acrylate copolymer; and styrene-ethylene copolymer.

12. The method in accordance with claim 1, wherein the halogen-free thermoplastic recyclate is selected from the group consisting of styrene-maleic acid anhydride copolymer; styrene-maleic acid anhydride graft copolymer; methyl methacrylate-styrene-butadiene graft copolymer; acrylonitrile-butadiene-styrene graft copolymer; and methacrylonitrile-butadiene-styrene graft copolymer.

* * * * *